(12) United States Patent
Dupont et al.

(10) Patent No.: US 8,450,262 B2
(45) Date of Patent: *May 28, 2013

(54) HYDROPHOBIC GROUP-CONTAINING COPOLYMER AND PROCESS FOR THE PRODUCTION THEREOF

(75) Inventors: Jeffrey Scott Dupont, Cincinnati, OH (US); Atsuro Yoneda, Osaka (JP); Akiko Hemmi, Osaka (JP)

(73) Assignee: The Procter & Gamble Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/061,532

(22) PCT Filed: Sep. 1, 2009

(86) PCT No.: PCT/JP2009/065557
§ 371 (c)(1),
(2), (4) Date: Jun. 22, 2011

(87) PCT Pub. No.: WO2010/024469
PCT Pub. Date: Mar. 4, 2010

(65) Prior Publication Data
US 2011/0251115 A1   Oct. 13, 2011

(30) Foreign Application Priority Data

Sep. 1, 2008   (JP) ................... 2008-223172

(51) Int. Cl.
*C11D 1/12* (2006.01)
*C11D 3/3707* (2006.01)
*C11D 3/3757* (2006.01)

(52) U.S. Cl.
USPC ........... 510/475; 510/276; 510/346; 510/351; 510/360; 510/361; 510/426; 510/434; 510/476; 510/477; 8/137

(58) Field of Classification Search
CPC ......... C11D 1/12; C11D 3/3707; C11D 3/3757
USPC ................ 510/276, 346, 351, 360, 361, 426, 510/434, 475, 476, 477; 8/137
See application file for complete search history.

(56) References Cited

U.S. PATENT DOCUMENTS

2009/0099053 A1   4/2009   Yoneda et al.

FOREIGN PATENT DOCUMENTS

| EP | 798320 | * | 10/1997 |
| EP | 1020558 | * | 7/2000 |
| JP | 2000-234261 A | | 8/2000 |
| JP | 2007 231262 | | 1/2007 |
| JP | 2007-254679 A2 | | 10/2007 |
| WO | WO 99/05243 | * | 2/1999 |
| WO | WO 2007/037469 A1 | | 4/2007 |
| WO | WO 2010/024469 A1 | | 3/2010 |

OTHER PUBLICATIONS

International Search Report, dated Dec. 29, 2009, containing 2 pages.

* cited by examiner

*Primary Examiner* — Brian P Mruk
(74) *Attorney, Agent, or Firm* — Melissa G Krasovec

(57) ABSTRACT

[Objective] This invention is to provide a novel copolymer suitably applicable to a detergent composition having an excellent precipitation inhibitory ability and showing a good washing effect even under severe conditions of washing with water used to take Japanese bath. [Solution] A laundry detergent or cleaning composition which comprises a hydrophobic group-containing copolymer characterized by having 1 wt % or more but below 50 wt % of a structural unit (a) derived from at least one kind of monomer (A) selected from ether bond-containing monomers.

9 Claims, No Drawings

HYDROPHOBIC GROUP-CONTAINING COPOLYMER AND PROCESS FOR THE PRODUCTION THEREOF

TECHNICAL FIELD

This invention pertains to a hydrophobic group-containing copolymer and process for the production of it.

BACKGROUND ART

Previously, detergents used for washing of clothes, etc., were being compounded with detergent builders (detergent aids) such as zeolite, carboxymethylcellulose, polyethylene glycol, etc., for the purpose of improving the washing effects of detergents.

In addition to various detergent builders described above, detergent compositions have been being compounded with polymers as a detergent builder.

For example, it has been reported to use (meth)acrylic acid-type polymers comprising (meth)acrylic acid-type monomers, 2-hydroxyethyl(meth)acrylate, $C_{2-12}$ alkyl(meth)acrylate and/or vinyl aromatic monomers in detergent builders and detergent compositions (e.g., refer to Patent Reference 1). The copolymer compositions described in the above patent reference 1 are disclosed to have effects of effective removal of hydrophobic dirt and stains of clothing such as collar dirt, oily stains, etc., and excellent resoil inhibiting ability preventing the dirt or stains once removed from reattaching to the washings even if the washing is carried out with a small amount of water.

Furthermore, it has been also disclosed to use polyalkylene glycol-type polymers having a glycidyl ether-origin hydrophobic site inside the chain and/or at the chain end, monomer unit derived from a polyalkylene glycol-type monomer with a polymeric double bond of an isoprenol, allyl alcohol or methallyl alcohol origin and at the same time, carboxylic acid group and/or sulfonic acid group as a detergent builder (refer to Patent Reference 2). In the patent reference 2, the above polymers have been disclosed to have a performance inhibiting precipitation of the surfactant and/or ability inhibiting resoiling with dirt removed once at the time of washing (called resoil inhibitory ability).

Furthermore, as a property presently required for detergent builders, there are not only abilities improving the detergency of detergents but also performance inhibiting or preventing any precipitation of the surfactant (it may be called simply precipitation inhibitory ability, below). In this case, the problem of surfactant precipitation is apparent as a result of bonding of anionic surfactants, for example, straight chain alkylbenzenesulfonic acids (salt (LAS) such as dodecylbenzenesulfonic acid (salt), etc., with calcium or magnesium ion present in water when the washing is carried out with water of relatively high hardness (refer to Non-patent Reference 1).

As an art improving the precipitation inhibitory ability, there is a technique disclosed in Patent Reference 3. In the patent reference 3, a graft copolymer of a hydrocarbon group-containing polyoxyalkylene compound with a specific amount of an acid group-containing unsaturated monomer graft-polymerized is shown to exhibit an excellent performance as a detergent builder.

CITATION LIST

Patent Literature

[PTL 1] Japanese Patent Publication (Kokai) No. 2007-231262

[PTL 2] WO2007/037469

[PTL 3] Japanese Patent Publication (Kokai) No. 2007-254679

Non-Patent Literature

[NPL 1] Louis Ho Tan Tai, "Formulating Detergents and Personal Care Products", AOCS Press, pp. 52-54 (2000).

SUMMARY OF THE INVENTION

Technical Problem

In spite of various polymers reported previously as described above, there has been no polymer exhibiting any satisfactory effect of precipitation inhibitory ability to date in the case of applications in detergents.

Therefore, this invention has been carried out considering the circumstances as described above, and its objective is to provide a polymer (or polymer composition) being able to inhibit any precipitation of the surfactant effectively in the case of detergent applications.

Another objective of this invention is to provide an effective process for the production of the above polymer (or polymer composition).

Solution Problem

The inventors of this invention studied diligently on various polymers (including copolymers) to accomplish the above objectives, and as a result, they found that a copolymer (hydrophobic group-containing copolymer) having a constituting unit originated from an ether bond-containing relatively hydrophobic monomer and carboxyl group-containing monomer-origin constituting unit in a specific proportion showed an excellent precipitation inhibitory ability (performance inhibiting/preventing precipitation of surfactants). This invention has been successfully carried out based on the above finding.

Specifically, this invention is a hydrophobic group-containing copolymer characterized by having 1 wt % or more but 50 wt % or less of a structural unit (a) derived from at least one kind of monomer (A) selected from ether bond-containing monomers represented by the following formulas (1) and (2);

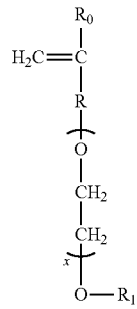

Formula (1)

in the above formula (1), $R_0$ is a hydrogen atom or $CH_3$ group, $R$ is a $CH_2$ group, $CH_2CH_2$ group or single bond, $X$ is a number in the range of 0-5 (provided $X$ is a number in the range of 1-5 if $R$ is a single bond), and $R_1$ is a hydrogen atom or organic group having 1-20 carbon atoms;

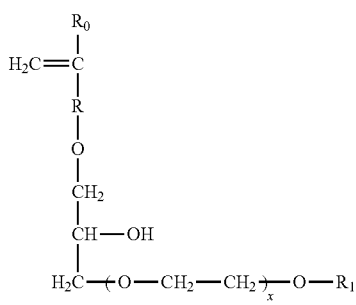

Formula (2)

in the above formula (2), $R_0$ is a hydrogen atom or $CH_3$ group, R is a $CH_2$ group, $CH_2CH_2$ group or single bond, X is a number in the range of 0-5, and $R_1$ is a hydrogen atom or organic group having 1-20 carbon atoms; and 50 wt % or more but 99 wt % or less of a structural unit (b) derived from a carboxyl group-containing monomer (B) as an essential constituting unit.

Advantageous Effects of Invention

The hydrophobic group-containing copolymer (or polymer composition) of this invention shows an excellent precipitation inhibitory ability (performance inhibiting/preventing precipitation of surfactants), and consequently, if the hydrophobic group-containing copolymer of this invention is used in a detergent composition, the precipitation of the surfactant of the detergent is effectively inhibited.

DESCRIPTION OF EMBODIMENTS

This invention is explained in detail as follows.
[Hydrophobic Group-Containing Copolymer of this Invention]
<Ether Bond-Containing Monomer as the Monomer (A)>

The hydrophobic group-containing copolymer of this invention is essentially required to have a specific proportion of a structural unit (a) originated from at least one kind of monomer (A) selected from ether bond-containing monomers represented by the following formulas (1) and (2).

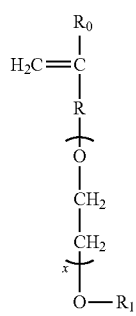

Formula (1)

In the above formula (1), $R_0$ is a hydrogen atom or $CH_3$ group, R is a $CH_2$ group, $CH_2CH_2$ group or single bond, X is a number in the range of 0-5 (provided X is a number in the range of 1-5 if R is a single bond), and $R_1$ is a hydrogen atom or organic group having 1-20 carbon atoms.

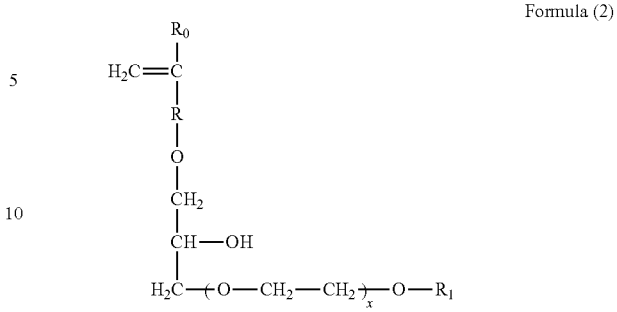

Formula (2)

In the above formula (2), $R_0$ is a hydrogen atom or $CH_3$ group, R is a $CH_2$ group, $CH_2CH_2$ group or single bond, X is a number in the range of 0-5, and $R_1$ is a hydrogen atom or organic group having 1-20 carbon atoms.

In the formula (1), R is preferably a $CH_2CH_2$ group because of a high effect improving the precipitation inhibitory ability of the copolymer prepared, and in the formula (2), R is preferably a $CH_2$ group because of a high effect improving the precipitation inhibitory ability of the copolymer prepared.

In the formulas (1) and (2), $R_1$ is a hydrogen atom or organic group having 1-20 carbon atoms, but $R_1$ is preferably an organic group having 4-18 carbon atoms, and it is optimally an organic group having 6-16 carbon atoms. $R_1$ may contain a functional group such as amino amide, hydroxyl, alkoxide, sulfonic acid, carbonyl, carboxyl, etc. $R_1$ may also contain ether bonding, sulfide bonding, ester bonding or amide bonding. The organic group is preferably an alkyl, aryl or alkenyl group.

As a preferable group for $R_1$, there are, for example, alkyl groups such as n-butyl, isobutyl, octyl, lauryl, stearyl, cyclohexyl and 2-ethylhexyl; alkenyl groups such as butylene, octylene, nonylene, etc.; and aryl groups such as phenyl, phenethyl, 2,3- or 2,4-xylyl, mesityl, naphthyl, etc.

As a preferable monomer of the formula (1), there are those compounds represented by the following formulas (3)-(7). Those compounds represented by the formulas (3)-(7) are preferably prepared by carrying out the reactions of allyl alcohol or isoprenol with corresponding 1) alkyl halides, 2) epoxy compounds, 3) glycidyl compounds, 4) ester compounds or 5) isocyanate compounds.

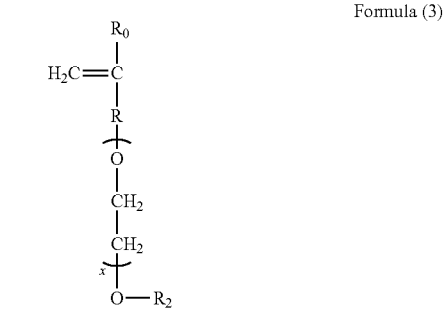

Formula (3)

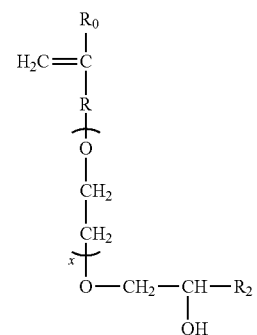

Formula (4)

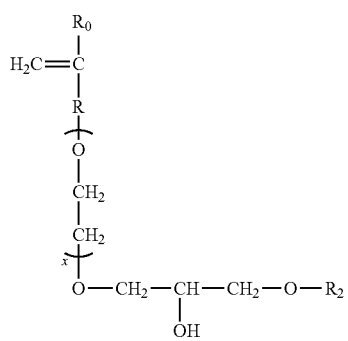

Formula (5)

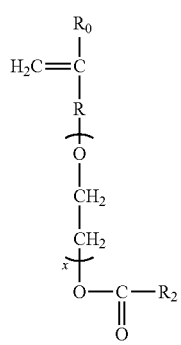

Formula (6)

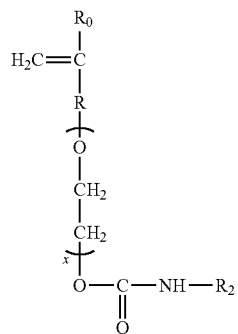

Formula (7)

In the formulas (3)-(7), $R_0$ is a hydrogen atom or $CH_3$ group, R and X are same as those in the formula (1). Furthermore, $R_2$ is an alkyl group having 1-20 carbon atoms, alkenyl group or aryl group.

As a preferable monomer of the formula (2), there are, for example, those compounds represented by the formulas (8)-(9). The compounds represented by the formulas (8)-(9) are preferably prepared by carrying out the reactions of allyl glycidyl ether with corresponding 1) alcohols or their alkylene oxide adducts or 2) amines.

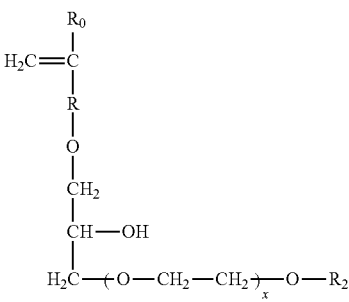

Formula (8)

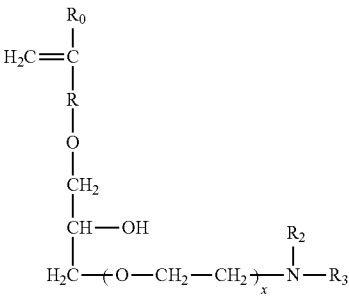

Formula (9)

In the formulas (8) and (9), $R_0$ is a hydrogen atom or $CH_3$ group, R and X are same as those in the formula (2). Furthermore, $R_2$ and $R_3$ are an alkyl groups having 1-20 carbon atoms, alkenyl groups or aryl groups.

The monomer (A) contains preferably no ester or amide group so that the hydrophobic group-containing copolymer of this invention exhibits its stable ability inhibiting precipitation under an alkaline condition.

In the above constituting unit (a), the unsaturated double bonding ($CH_2=CH-$) in the monomer (A), that is, the above formula (1) or (2) becomes in a form of single bonding ($-CH_2-CH-$).

The hydrophobic group-containing copolymer of this invention is essentially required to have 1 wt % or more but below 50 wt %, on 100 wt % of the total amount of monomer-origin structures, of the a structural unit (a) derived from at least one kind of monomer (A) selected from ether bond-containing monomers represented by the above formulas (1) and (2). In this invention, the monomer is a compound having an unsaturated double bond (carbon-carbon double bond). If the proportion of the structural unit (a) is the above range, the effect improving the precipitation inhibition ability of the copolymer is excellent. The proportion of the structural unit (a) on 100 wt % of the total amount of monomer-origin structures is preferably 2 wt % or more but below 40 wt %, and it is optimally 3 wt % or more but below 30 wt %. As a result of the hydrophobic group-containing copolymer of this invention having the monomer (A)-origin structure unit (a) in the above range, the precipitation inhibition ability is improved.

As a result of the hydrophobic group-containing copolymer of this invention having a relatively hydrophobic structural unit (a) introduced, the hydrophobic group-containing copolymer can improve the interaction with the surfactant becoming able to inhibit the precipitation of the surfactant. Furthermore, the copolymerization of the monomer (A) with the monomers (B) and (C) is carried out relatively easily even in a hydrophilic solvent such as water, etc., and consequently, it is possible to improve the precipitation inhibition ability of the hydrophobic group-containing copolymer prepared markedly.

<Carboxyl Group-Containing Monomer>

The hydrophobic group-containing copolymer of this invention is essentially required to have a carboxyl group-containing monomer (B)-origin structural unit (b) in a specific proportion.

The carboxyl group-containing monomer (B) of this invention is a monomer essentially having 1) unsaturated double bond and 2) carboxyl group and/or salt [those monomers belonging to the monomer (A) or monomer (C) are excluded from the monomer (B)]. Specifically, there are, for example, unsaturated monocarboxylic acids or salts such as acrylic acid, methacrylic acid, crotonic acid, α-hydroxyacrylic acid, α-(hydroxymethyl)acrylic acid, their derivatives, etc.; and unsaturated dicarboxylic acids and salts such as itaconic acid, fumaric acid, maleic acid, etc. The unsaturated dicarboxylic acid-type monomer in this case may be a monomer having a single unsaturated bond and two carboxylic groups, and preferred specific examples include maleic acid, itaconic acid, citraconic acid, fumaric acid, their univalent metal salts, divalent metal salts, ammonium salts, organic ammonium salts (organic amine salts) and anhydrides. Furthermore, the (meth)acrylic acid-type monomers may be half-esters of unsaturated dicarboxylic acid-type monomers with alcohols having 1-22 carbon atoms; half-amides of unsaturated dicarboxylic acid-type monomers with amines having 1-22 carbon atoms; half-esters of unsaturated dicarboxylic acid-type monomers with glycols having 2-4 carbon atoms; half-amides of maleamic acid with glycols having 2-4 carbon atoms; etc.

As a salt of unsaturated mono- or dicarboxylic acid, there are metal salts, ammonium salts and organic amine salts. As a metal salt in this case, there are univalent metal salts of alkaline metals such as sodium, lithium, potassium, rubidium, cesium, etc.; alkaline earth metals such as magnesium, calcium, strontium, barium, etc.; and elements such as aluminum, iron, etc. As an organic amine salt, there are organic amine salts of alkanolamines such as monoethanolamine, diethanolamine, triethanolamine, etc., and polyamines such as ethylenediamine, triethylenediamine, etc. The use of ammonium, sodium or potassium salts among them is preferable because of high effects improving the precipitation inhibitory performance of the copolymer prepared, and the use of sodium salts is optimal.

The use of acrylic acid, acrylate, maleic acid or maleate among the carboxyl group-containing monomers (B) is preferable because of the copolymer prepared providing a high effect improving the precipitation inhibitory performance, and the essential use of acrylic acid or acrylate is optimal.

In the case of a carboxyl group-containing monomer (B), it is possible to use only 1 kind of the monomer, but the structure may be derived from 2 or more kinds of the monomers. In this case, the hydrophobic group-containing copolymer of this invention has the total of the structural unit (b) originated from all kinds of the carboxyl group-containing monomers (B) used in a specific proportion.

In the above structural unit (b), the unsaturated double bonding ($CH_2$=CH—) in the monomer (B) becomes in a form of single bonding (—$CH_2$—CH—).

The hydrophobic group-containing copolymer of this invention is essential to contain 50 wt % or more but below 99 wt % of the carboxyl group-containing monomer (B)-origin structural unit (b) on 100 wt % of the total monomer-origin structures. If the proportion of the structural unit (b) is within the above range, the copolymer prepared provides an excellent effect for improving the precipitation inhibitory performance. The proportion of the structural unit (b) on the 100 wt % of the total monomer-origin structures is preferably 60 wt % or more but below 98 wt %, and optimally, it is 70 wt % or more butt below 97 wt %.

If the hydrophobic groups-containing copolymer of this invention is used as a detergent builder, the water solubility of the polymer is improved because of the structural unit (b) contained in a specific proportion, and because of the structural unit (a), it can provide an inhibitory effect on surfactant precipitation.

Incidentally, in the case of computation of a proportion by weight (wt %) of the carboxyl group-containing monomer (B)-origin structural unit (b) on the total monomer-origin structures in this invention, the computation is carried out as the corresponding acid. For example, in the case of a sodium acrylate-origin structural unit —$CH_2$—CH(COONa)—, the computation is carried out for the proportion by weight (wt %) of an acrylic acid-origin unit —$C_{1-12}$—CH(COOH)—. Similarly in the case of a proportion by weight (wt %) of the carboxyl group-containing monomer (B) on the total monomers, the computation is carried out as the corresponding acid. For example, in the case of a sodium acrylate, the computation is carried out for the proportion by weight (wt %) as acrylic acid.

Furthermore, in the case of computation of a proportion by weight (wt %) of a structural unit originated from an acid group-containing monomer other than the carboxyl group-containing monomer (B) on the total monomer-origin structures, the computation is to be carried out as the corresponding acid; and in the case of computation of a proportion by weight (wt %) of an acid group-containing monomer other than the carboxyl group-containing monomer (B) on the total monomers, the computation is to be carried out as the corresponding acid. In the case of an amino group-containing monomer-origin structural unit and amino group-containing monomer, the weight computation is carried out as the corresponding un-neutralized amine-origin structural unit and un-neutralized amine, respectively. For example, in the case of vinyl amine hydrochloride, the proportion by weight (wt %) is calculated as a vinyl amine, which is the un-neutralized amine.

<Other Monomer>

The hydrophobic group-containing copolymer of this invention may have another monomer (C)-origin structural unit (C).

The monomer (C) in case the hydrophobic group-containing copolymer of this invention contain another monomer (C) is not especially restricted as long as it is copolymerizable with the above monomer (A) and/or (B), and it is selected depending on the effect desired. Specifically, there are, for example, sulfonic acid group-containing monomers such as vinylsulfonic acid, styrenesulfonic acid, allylsulfonic acid, methallylsulfonic acid, acryladmide-2-methylpropanesulfonic acid, sodium 2-hydroxyl-3-allyloxypropanesulfonate, sodium 2-hydroxyl-3-methallyloxypropanesulfonate, isoprenesulfonic acid, sulfoethyl acrylate, sulfoethyl methacrylate, sulfopropyl acrylate, sulfopropyl methacrylate, 2-hydroxyl-3-butenesulfonic acid, etc., and their salts; N-vinyl monomers such as N-vinylpyrrolidone, N-vinylformamide, N-vinylacetamide, N-vinyl-N-methylformamide, N-vinyl-N-methylacetamide, N-vinyloxasolidone, etc.; amide-type monomers such as (meth)acrylamide, N,N-dimethylacrylamide, N-isopropylacrylamide, etc.; alkyl (meth)acrylate monomers such as butyl (meth)acrylate, 2-ethylhexyl (meth)acrylate, dodecyl (meth)acrylate, etc.; hydroxyl group-containing monomers such as 3-(meth)allyloxy-1,2-dihydroxypropane, 3-allyloxy-1,2-dihydroxypropane, 3-allyloxy-1,2-dihydroxypropane, (meth)ally alcohol, isoprenol, etc., with 6-200 moles of ethylene oxide added (3-allyloxy-1,2-di(poly)oxyethylene ether propane, etc.); polyalkylene glycol (meth)acrylate, etc.; hydroxyalkyl (meth)acrylate type monomers such as hydroxymethyl (meth)acrylate, 2-hydroxyethyl (meth)acrylate, 2-hydroxypropyl (meth)acrylate, 3-hydroxypropyl (meth)acrylate, hydroxybutyl (meth)acrylate, 2-hydroxybutyl (meth)acrylate, 4-hydroxybutyl (meth)acrylate, α-hydroxymethylethyl (meth)acrylate, hydroxypentyl (meth)acrylate, hydroxyneopentyl (meth)acrylate, hydroxyhexyl (meth)acrylate, etc.; vinyl allyl monomers such as styrene, indene, vinylaniline, etc.; isobutylene, vinyl acetate, etc.

Furthermore, the above other monomer (C) may be used alone as a single kind or a mixture of 2 or more kinds.

The hydrophobic group-containing copolymer of this invention has the above constituting units (a) and (b) and if necessary, constituting nit (c) in the above specific proportions, and the respective constituting units may be present either in a block or random state. Furthermore, the mean weight-average molecular weight of the hydrophobic group-containing copolymer of this invention is suitably settable, and it is not especially restricted. Specifically, the weight-average molecular weight of the hydrophobic group-containing copolymer of this invention is generally in the range of 2,000-200,000, preferably 30,000-60,000 and optimally 4,000-30,000. If the weight-average molecular weight is within the above range, the precipitation inhibitory ability is liable to be improved. Incidentally, the weight-average molecular weight in this specification is defined as a result of measurement with GPC (gel permeation chromatography), and the computation is carried out with the specific measurement method described in the application example.

The hydrophobic group-containing copolymer of this invention has excellent ability inhibiting precipitation of surfactants, and it is applicable to, for example, detergent compositions.

[Hydrophobic Group-Containing Copolymer Composition (it may be Simply Called as a Polymer Composition, Below)]

The hydrophobic group-containing copolymer composition of this invention contains the hydrophobic group-containing copolymer of this invention as an essential component, the use of any component other than the hydrophobic group-containing copolymer of this invention is optional, but in general, it contains one or more of other components such as polymerization initiator residue, residual monomer, polymerization reaction byproduct and moisture content. The hydrophobic group-containing copolymer composition of this invention has a preferable configuration containing 30-80 wt % of the hydrophobic group-containing copolymer of this invention and 20-70 wt % of water.

[Process for the Production of the Hydrophobic Group-Containing Copolymer of this Invention]

The process for the hydrophobic group-containing copolymer of this invention may be a known process for the polymerization reaction used as it is or after slight modification. In the process for the production of the hydrophobic group-containing copolymer of this invention, the copolymerization of monomer components containing the ether bond-containing monomer (A) and carboxyl group-containing monomer (B), respectively as an essential component is carried out to obtain the product. Furthermore, the copolymerization reaction of those monomer components may be carried out with the above other monomer (C) as an optional component.

In the above process for the production, the copolymerization reaction of the monomer components may be carried out with a polymerization initiator.

Incidentally, the kinds and amounts of the monomers contained in the monomer components are to be suitably adjusted so that the constituting units forming the hydrophobic group-containing copolymer of this invention are those described above. Specifically, the content proportions of the monomers consisting the hydrophobic group-containing copolymer of this invention are, on the total amount of the monomers, 1 wt % or more but less than 50 wt % of the ether group-containing monomer (A) and 50 wt % or more but less than 99 wt % of the carboxyl group-containing monomer (B). As described above, it is also possible to use another monomer (C), which is copolymerizable with these monomers, in the amount in the range of 0-10 wt % when the total amount of the monomers (A)-(B) is 100 wt %. Preferably, the proportion of the ether bond-containing monomer (A) is 2 wt % or more but less than 40 wt %, and the proportion of the carboxyl group-containing monomer (B) is 60 wt % or more but less than 98 wt %. Furthermore, in the optical case, it is to use 3 wt % or more but less than 30 wt % of the ether bond-containing monomer (A) with 70 wt % or more but less than 97 wt % of the carboxyl group-containing monomer (B). The total amount of the above monomers (A), (B) and (C) is set at 100 wt %.

The copolymerization of the monomers (A)-(B) and if necessary, other monomer (C) is preferably carried out with a solvent containing 50 wt % or more of water and/or in the presence of a chain-transfer agent, and optimally, it is carried out with a solvent containing 50 wt % or more of water in the presence of a chain-transfer agent. In this case, the solvent used contains 50 wt % or more of water restricting the amount of any organic solvent used in the polymerization reaction, and consequently, there is an advantage of the removal of the organic solvent by distillation after completing the polymerization reaction being easy. Furthermore, if the reaction is carried out in the presence of a chain-transfer agent, the hydrophobic group-containing copolymer to be prepared is inhibited from become a high molecular weight polymer higher than necessary, and there is an advantage of being able to carry out effective manufacturing of the hydrophobic group-containing copolymer of this invention having a low molecular weight. Especially, if the chain-transfer agent used is a sulfurous acid or sulfite, it is possible to introduce a sulfonic acid group quantitatively at the terminal end of the hydrophobic group-containing copolymer, as explained later in detail, and the gel resistance is improved.

Therefore, the process for the production of this invention has a preferable configuration pertaining to a process for the production of a hydrophobic group-containing copolymer containing a stage to carry out copolymerization by using 1 wt % or more but less than 50 wt % of the ether bond-containing monomer (A) of the formula (1), 50 wt % or more but less than 99 wt % of the hydroxyl group-containing monomer of the formula (2) and if necessary, another monomer (C) [provided the total proportion of the monomers (A), (B) and (C) being 100 wt %]; allowing the solvent used to contain 50 wt % or more of water; and furthermore, using a chain-transfer agent.

As a solvent usable in the above mode, there is no special restriction as long as it contains 50 wt % or more of water on the total amount of solvent used. From the viewpoint of improving the solubility of the monomers used for the polymerization reactions in the solvent, an organic solvent is also desirably used. Even in this case, the water content in the whole solvent mixture is 50 wt % or higher. As an organic solvent usable in this case, there are, for example, lower alcohols such as methanol, ethanol, isopropyl alcohol, etc.; lower ketones such as acetone, methyl ethyl ketone, diethyl ketone, etc.; ethers such as dimethyl ether, dioxane, etc.; and amides such as dimethylformamide, etc. In the case of these solvents used, the content of water is preferably 80 wt % or higher on the total amount of solvent mixture used, and the use of water alone (that is, 100 wt % water) is optimal.

In the process for the production of this invention, the copolymerization reaction is preferably carried out in the presence of a chain-transfer agent. The chain-transfer agent used in this case is not especially restricted as long as it is a compound enabling molecular weight adjustment, and any of those know chain-transfer agents is usable. Specifically, there are, for example, thiol-type chain-transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, butyl thioglycolate, etc.; halides such as carbon tetrachloride, methylene chloride, bromoform, bromotrichloroethane, etc.; secondary alcohols such as isopropanol, glycerol, etc.; and lower oxides and their salts such as phosphorous acid, hypophosphorous acid and their salts (sodium hypophosphate, potassium hypophosphate, etc.), sulfurous acid, hydrogen sulfurous acid, dithionous acid, metabisulfurous acid and their salts (sodium hydrogen sulfite, potassium hydrogen sulfite, sodium dithionite, potassium dithionite, sodium metabisulfite, potassium metabisulfite, etc.), etc. These chain-transfer agents may be used alone or as a mixture of 2 or more kinds. The use of sulfurous acid or sulfites is suitable in the copolymerization reaction of this invention. As a result, it is possible to introduce a sulfonic acid group quantitatively at the terminal end of the main chain of the hydrophobic group-containing copolymers and consequently improve the gel resistance. Incidentally, the quantitative introduction of a sulfonic acid groups implies the sulfite used being functioning very well as a chain-transfer agent. Therefore, it becomes unnecessary to add the chain-transfer agent in an excess amount to the polymerization reaction system reducing the copolymer production costs, at the same time, improving the production efficiency and satisfactorily reducing the amount of impurities formed. Furthermore, as a result of the addition of a sulfite to the polymerization reaction system, it is possible to inhibit the copolymer to have a high molecular weight higher than necessary.

In the process for the production described above, sulfurous acid and/or sulfite [simply called sulfurous acid (salt), below] is contained as a chain-transfer agent. In addition to sulfurous acid (salt), a polymerization initiator is used in the process for the production described above. It is also possible to use a heavy metal ion as a reaction promoter.

The above sulfurous acid (salt) is sulfurous acid, hydrogen sulfurous acid or their salt, and it is optimally in the form of a salt of sulfurous acid or hydrogen sulfurous acid. If a sulfurous acid or hydrogen sulfurous acid is used, specific examples include those salts described above and metal atom salts, ammonium salts and organic ammonium salts. As a metal atom in the metal atom salts, there are, for example, univalent atoms of alkali metal elements such as lithium, sodium, potassium, etc.; divalent atoms of alkaline earth metal elements such as calcium, magnesium, etc.; and trivalent metal atoms of elements such as aluminum, iron, etc. Furthermore, as an organic ammonium (organic amine), there are suitably alkanol amines such as ethanolamine, diethanolamine, triethanolamine, etc., triethylamine, etc. In addition ammonium sulfite is also usable. Therefore, as a sulfite preferably usable in this invention, there are, for example, sodium hydrogen sulfite, potassium hydrogen sulfite, ammonium hydrogen sulfite, sodium sulfite, potassium sulfite, ammonium sulfite, etc., and the use of sodium hydrogen sulfite is optimal. Those sulfuric acid (salt) compounds are usable alone or as a mixture of 2 or more kinds.

The amount of a chain-transfer agent to be added in the process of this invention is not especially restricted as long as the polymerization of the monomers (A) and (B) and if necessary, monomer (C), but preferably it is in the range of 1-20 g, optimally 2-15 g per mole of the whole content of the monomers (A) and (B) and if necessary, monomer (C). If it is less than 1 g, there may be a difficulty controlling the molecular weight, on the other hand, if it is over 20 g, the amount of impurities formed is increased causing a risk of reducing the purity of the polymer prepared, and especially in the case of a sulfite used, any excess amount of the sulfite is decomposed inside the reaction system causing a risk of generating sulfurous acid gas. In addition, there is also a risk of causing an economical disadvantage.

As an initiator, any of those previously known initiators is usable, there are, for example, hydrogen peroxide; persulfates such as sodium persulfate, potassium persulfate, ammonium persulfate, etc.; azo compounds such as 2,2'-azobis(2-amidinopropane) hydrochloride, 4,4'-azobis(4-cyanovaleric acid), azobisisobutylonitrile, 2,2'-azobis(4-methoxyl-2,4-dimethylvaleronitrile), etc.; and organic peroxides such s benzoyl peroxide, lauroyl peroxide, peracetic acid, di-t-butyl peroxide, cumen hydroperoxide, etc. The use of hydrogen peroxide and persulfates among these polymerization initiator is preferably, and the use of persulfates is optimal. These polymerization initiators may be used alone or as a mixture of 2 or more kinds.

The amount of a polymerization initiator to be used is not especially restricted as long as it is sufficient to start the copolymerization reaction of the monomers (A) and (B) and if necessary, monomer (C), but it is generally below 10 g, preferably in the range of 1-5 g per mole of the total monomer components such as monomers (A) and (B) and if necessary monomer (C).

The heavy metal ion used in the reaction promoter of this invention is a metal ion of metal having specific gravity of 4 $g/cm^3$ or higher. Specific examples of the metal of such a metal ion includes preferably iron, cobalt, manganese, chromium, molybdenum, tungsten, copper, silver, gold, lead, platinum, iridium, osmium, palladium, rhodium, ruthenium, etc. These heavy metals are usable alone or as a mixture or 2 or more kinds. The use of iron among them is preferable. The ionic valency of these heavy metal ions is not especially restricted, and if the heavy metal used is iron, the iron ion in the initiator may be $Fe^{2+}$, $Fe^{3+}$ or their combination.

The state of the above heavy metal ion is not especially restricted as long as it is present in an ionic form, but it is preferable to use a solution prepared by dissolving a heavy metal compound because of easy handling. The heavy metal compound usable in this case may be any compound containing the desired heavy metal ion desired to be contained in the initiator, and it may be determined depending on the specific initiator to be used. If the above heavy metal ion is an iron, preferable examples of heavy metal compounds useable include Mohr salt [$Fe(NH_4)_2(SO_4)_2.6H_2O$], ferric sulfate heptahydrate, ferrous chloride, ferric chloride, etc. Furthermore, if heavy metal ion used is manganese, manganese chloride, etc., may be suitably used. These heavy metal compounds are all water-soluble compounds, thus, it is possible to used them in the form of aqueous solutions, and consequently, the handle-ability is excellent. Incidentally, the solvent used to dissolve the above heavy metal compounds to prepare their solutions is not necessarily limited to water, and it is possible to use any solvent as long as it can dissolve the heavy metal compound and does not interfere with the polymerization reaction in the process for the production of hydrophobic group-containing copolymer of this invention.

If the above heavy metal ion is to be used, the amount heavy metal ion is preferably a catalyst quantity in the polymerization process of this invention. The catalyst quantity in this specification means the amount acting as a catalyst and not incorporated in the desired final product. Specifically, it is below 100 ppm, preferably below 10 ppm and optimally below 5 ppm.

Furthermore, the content of the above heavy metal ion is preferably in the range of 0.1-10 ppm on the total weight of the polymerization reaction mixture at the time of the completion of the polymerization reaction. If the content of the heavy metal ion is below 0.1 ppm, there is a risk of the effect of the heavy metal ion added not being exhibited satisfactory. On the other hand, if the content of the heavy metal ion added is over 10 ppm, there is a risk of the coloration of the copolymer prepared being damaged. Furthermore, if the heavy metal ion content is high, and the polymer product is used as a detergent builder, there is a risk of causing contamination in the detergent builder.

The above at the time of the completion of the polymerization reaction means the time point when the polymerization reaction has been practically completed in the polymerization reaction solution, and the desired copolymer has been prepared. For example, if the polymer formed as a result of polymerization in the polymerization reaction mixture solution is to be neutralized with an alkaline component, the content of the heavy metal ion is calculated based on the total weight of the polymerization reaction solution after neutralization. If it contains two or more kinds of heavy metal ions, the total amount of the heavy metal ions may be set in the above range.

In the case of combination of the above initiator and chain-transfer agent, one kind or more each of the above persulfates and sulfites are optimally used. In this case, the persulfate to sulfite mixing ratio is not especially restricted, but 0.5-5 parts by weight of sulfite is preferably used for 1 part by weigh of persulfate. Especially, the lower limit of sulfite is 1 part by weight per pat by weight of persulfate, and it is optimally 2 parts by weight. Furthermore, the upper limit of sulfite is 5 especially 3 parts by weight per part by weight of persulfate, and it is optimally 3 parts by weight. If the amount of sulfite is below 0.5 part by weight, there is a risk of increasing the total amount of initiator to achieve a low molecular weight, on the other hand, if it is over 5 parts by weight, the extent of the side reactions is increased causing a risk increasing the amount of impurities formed as a result.

The combination of the above chain-transfer agent, polymerization initiator and reaction promoter is not especially restricted, and the compounds are suitably selected from those examples described above. For example, as a suitable combination of chain-transfer agent, polymerization initiator and reaction promoter, there are combinations such as sodium hydrogen sulfite (SBS)/hydrogen peroxide ($H_2O_2$), sodium hydrogen sulfite (SBS)/sodium persulfate (NaPS), sodium hydrogen sulfite (SBS)/Fe, sodium hydrogen sulfite (SBS)/hydrogen peroxide ($H_2O_2$)/Fe, sodium hydrogen sulfite (SBS)/sodium persulfate (NaPS)/Fe, sodium hydrogen sulfite (SBS)/sodium persulfate (NaPS)/hydrogen peroxide ($H_2O_2$), sodium hydrogen sulfite (SBS)/oxygen/Fe, etc. The combination is preferably sodium hydrogen sulfite (SBS)/sodium persulfate (NaPS) or sodium hydrogen sulfite (SBS)/sodium persulfate (NaPS)/Fe, and it is optimally sodium hydrogen sulfite (SBS)/sodium persulfate (NaPS)/Fe.

The total amount of the above chain-transfer agent, polymerization initiator and reaction promoter is in the range of 2-20 g per mole of the total monomer components, that is, monomers (A) and (B) and if necessary, monomer (C). As a result of the total amount within this range, it is possible to prepare the hydrophobic group-containing copolymer of this invention efficiently, and furthermore, the molecular weight distribution of the hydrophobic group-containing copolymer can be set in a desired range. It is preferably in the range of 4-18 g, and it is optimally in the range of 6-15 g.

The above polymerization initiator and chain-transfer agent are added to the reactor with a suitable method such as dripping, split addition, etc. Furthermore, the reactor may be charged with the chain-transfer agent alone, or it may be mixed in advance with the monomer components, that is, monomers (A)-(B) and if necessary, monomer (C) and other reaction components such as solvent, etc.

In the copolymerization process described above, the reactor is charged with the monomer components, polymerization initiator, etc., as follows. Specifically, it is possible to use a method charging the reactor with all monomer components and subsequently adding the polymerization initiator to start and carry out the copolymerization reaction; method charging the reactor with a portion of the monomer components and subsequently adding the remaining portion of the monomer components and polymerization initiator continuously or in steps (preferably continuously) to carry out the copolymerization reaction; method charging the reactor with the polymerization solvent alone and subsequently adding the whole amount of the monomer components and polymerization initiator; method charging the reactor with a portion of one of the monomers (A)-(B) [for example, monomer (B)] and subsequently adding the monomer (A), remaining portion of the monomer (B) and if necessary monomer (C) to the reactor (preferably continuously) to carry out the copolymerization reaction; etc. Among those methods, the use of the method adding the polymerization initiator and monomer components in drops to the reactor to carry out the copolymerization reaction is preferable because it is possible to obtain a narrow (sharp) molecular weight distribution for the copolymer obtained, and the dispersibility in the case of applications as a detergent builder is improved.

The above process for the copolymerization of this invention may be carried out with a conventionally used method such as solution, bulk, suspension or emulsion polymerization, and there is no special restriction, but the use of solution polymerization is preferable. As described above, the solvent used in this case is preferably a solvent mixture containing water in the amount corresponding to 50 wt % or more on the total amount of solvent used or water. If water alone it to be used, it is suitably convenient because it is possible to eliminate a solvent removal stage.

The copolymerization process of this invention described above may be carried out in a batch or continuously. Furthermore, at the time of copolymerization, a known suitable solvent selectable from those known solvents may be used if necessary. It is suitably possible to use water; alcohols such as methyl alcohol, ethyl alcohol, isopropyl alcohol, isopropyl alcohol, etc.; glycerol; polyethylene glycol, glycol, etc.; aromatic or aliphatic hydrocarbons such as benzene, toluene, xylene, cyclohexane, n-heptane, etc.; esters such as ethyl acetate, etc.; ketones such as acetone, methyl ethyl ketone, etc.; amides such as dimethylformamide, etc.; and ethers such as diethyl ether, dioxane, etc. These solvents may be used alone or concomitantly as a mixture of 2 or more kinds.

Considering the solubility of the monomers and copolymers to be prepared, it is preferable to use 1, 2 or more kind of solvents selected from water and lower alcohols having 1-4 carbon atoms.

The amount of the above solvent to be used is in the range of 40-200 wt % on 100 wt % of the monomers. It is preferably 45 wt % or higher, optimally 50 wt % or higher. Furthermore, it is preferably below 180 wt %, optimally below 150 wt %. If the amount of the solvent used is below 40 wt %, there is a risk of the molecular weight of the copolymer prepared to be increased too high, on the other hand, if it is over 200 wt %, there is a risk of the concentration of the copolymer prepared becoming so low that it is required to carry out solvent removal procedures. Incidentally, the reactor may be charged with the whole or partial amount of the solvent in the initial period of the polymerization reaction, a portion of the solvent may be added (in drops) to the reaction system during the polymerization reaction, or the monomers, initiator, etc., may be dissolved in the solvent, and the solvent may be added (in drops) together with these components to the reaction system during the polymerization reaction.

In the copolymerization process described above, the copolymerization reaction conditions such as temperature, etc., are suitably set depending on the copolymerization method, solvent and initiator used, and the copolymerization temperature is generally 0° C. or above, but below 150° C. It is preferably 40° C. or above and optimally 80° C. or above, but it is preferably below 120° C. and optimally below 110° C. Especially in the case of sulfurous acid (salt) being used, the copolymerization temperature is generally in the range of 60-95° C., preferably 70-95° C. and optimally 80-95° C. If it is below 60° C., there is a risk of a large amount of sulfurous acid (salt)-origin impurities being formed. On the other hand, if is over 95° C., there is a risk of toxic sulfurous acid gas being released.

The above copolymerization temperature is not necessarily required to maintain always at a constant level. For example, the polymerization reaction may be started at room temperature, the temperature is subsequently raised to the desired temperature at a suitable temperature-raising speed or time, and the desired temperature is subsequently maintained, or alternatively, the temperature may be allowed to fluctuate (raising or reducing) during the polymerization reaction depending on the method adding the monomers, initiator, etc.

The time for the above copolymerization reaction is generally in the range of 30-300 min, preferably 60-240 min and optimally 120-180 min.

The pressure of the reaction system in the above process for the copolymerization reaction is any of normal pressure (atmospheric pressure), reduced pressure or added pressure, but considering the molecular weight of the copolymer to be prepared, the reaction is preferably carried out under atmospheric pressure or added pressure after sealing the reaction system. Furthermore, the reaction under atmospheric pressure is preferable with respect to facilities required such as pressure addition or reduction device, pressure-resistance reactor and piping system, etc. The atmosphere inside the reaction system may be air, but it is preferably an inert gas atmosphere, and prior to carrying out the polymerization reaction, the reaction system is preferably flushed with an inert gas such as nitrogen.

The pH during the polymerization reaction in the above copolymerization is generally acidic, and especially in the case of concomitant use of persulfate and sulfite in the reaction system, the polymerization reaction is preferably carried out under an acidic condition. As a result of the reaction being carried out under an acidic condition, the aqueous solution viscosity elevation in the polymerization reaction system is inhibitable, and the production of the copolymer can be carried out well. Furthermore, it becomes possible to carry out the reaction under a condition of a high concentration drastically improving the production efficiency. Specifically, it is possible to carry out the polymerization reaction at a high concentration of the final solid content concentration over 40%, and it is possible to prepare the final product showing the total residual monomer concentration below 15,000 ppm. Furthermore, the polymerizability of the ether bond-containing monomer can be improved.

Under the acidic condition described above, the pH of the reaction mixture during the polymerization reaction at 25° C. is generally in the range of 1-6, it is preferably below 5 and it is optimally below 3. The copolymer prepared with the above process for the copolymerization reaction may be usable in detergent compositions as a component (detergent builder), but if necessary, the final product may be neutralized with an alkaline substance. As a preferable alkaline substance, there are, for example, inorganic salts such as hydroxides, chlorides, carbonates, etc., of uni- or divalent metals, organic ammonium compounds (organic amines), etc.

The degree of neutralization in the case of copolymerization is suitably adjustable with the initiator. For example, in the case of persulfate and sulfite concomitantly used, and the monomers can form salts, the copolymerization reaction of the monomers is preferably carried out with the degree of neutralization of the carboxyl group-containing monomer set in the range of 0-60 mol %. The degree of neutralization of a monomer in this case is represented by mol % of the monomer forming a salt if the total number of mol of the monomer is set at 100 mol %. If the degree of neutralization of the monomer is over 60 mol %, the polymerization rate in the copolymerization reaction stage is not increased causing a risk of the molecular weight of the copolymer prepared to be reduced to too low or production efficiency being reduced. It is preferably below 50 mol %, especially below 40 mol %, furthermore, below 30 mol %, especially desirably below 20 mol % and optimally below 10 mol %.

As a method for carrying out copolymerization with the degree of monomer neutralization in the range of 0-60 mol %, for example in the case of an unsaturated carboxylic acid-type monomer, there is a method wherein the unsaturated carboxylic acid monomer may be used for the copolymerization without any neutralization or neutralized with an alkaline substance to a form of salt such as sodium or ammonium salt with a degree of neutralization in the range of 0-60 mol % before using in the copolymerization reaction.

The hydrophobic group-containing copolymer of this invention prepared as described above is usable as a water treatment agent, fiber treatment agent, dispersant, detergent builder (or detergent composition component), scaling prevention agent (scaling inhibitor), metal ion sequestering agent, thickener, various kinds o binders, emulsifier, skin-care agent, hair-care agent, etc. As a detergent builder, it is applicable to detergents used for various applications such as clothing, dish washing, house cleaning, hair washing, body washing, tooth-brushing, car-cleaning, etc.

<Water-Treatment Agent>

The hydrophobic group-containing copolymer (or polymer composition) of this invention is usable as a water-treatment agent. This water-treatment agent may be compounded, if necessary, with other components such as polymerized phosphate, phosphonate, anti-corrosion agent, slime-controlling agent, chelating agent, etc.

The above water-treatment agent is useful for scaling inhibitory applications in cooling water circulation system, boiler water circulation system, seawater desalination plant, pulp digester, black liquid concentration reactor, etc. This treatment agent may contain an optionally suitable water-soluble polymer within a range causing no effect on the performance and effect.

<Fiber-Treatment Agent>

The hydrophobic group-containing copolymer (or polymer composition) of this invention is usable as a fiber-treatment agent. The fiber-treatment agent contains at least one component selectable from a group comprising coloring agents, peroxides and surfactants and hydrophobic group-containing copolymer (or polymer composition) of this invention.

The content of the hydrophobic group-containing copolymer of this invention in the above fiber-treatment agent is in the range of 1-100 wt %, preferably 5-100 wt % on the total amount of the fiber-treatment agent. This treatment agent may contain an optionally suitable water-soluble polymer within a range causing no effect on the performance and effect.

A compounding example of this fiber-treatment agent close to a preferred embodiment of this invention is explained as follows. This fiber-treatment agent is applicable in fiber treatment process stages such as degumming, dyeing, bleaching and soaping. The coloring agents, peroxides and surfactants usable are those conventionally used in fiber-treatment agents.

A preferable example of the fiber-treatment agent has a composition of 1 part by weight of the compounding proportion of the hydrophobic group-containing copolymer of this invention compounded with 0.1-100 parts by weight at least one component selectable from a group comprising coloring agents, peroxides and surfactants to improve, for example, whiteness of fiber and coloring fastness and prevent uneven coloring.

The above fiber-treatment agent is applicable to any optionally suitable fibers. For example, there are cellulose-type fibers such as cotton, hemp, etc.; synthetic fibers such as Nylon, polyester, etc.; animal fibers such as wool, silk, etc.; semi-synthetic fibers such as rayon, etc.; their fabrics; and their mixed spun products.

If the above fiber-treatment agent is to be applied to the degumming stage, the composition contains preferably the hydrophobic group-containing copolymer of this invention, alkaline agent and surfactant. In the case of applications to the bleaching stage, the composition contains preferably the hydrophobic group-containing copolymer of this invention, peroxide and silicic acid-type chemical such as sodium silicate as an alkaline bleach decomposition inhibitor.

<Inorganic Pigment Dispersant>

The hydrophobic group-containing copolymer (or polymer composition) of this invention is usable as a inorganic pigment dispersant. This inorganic pigment dispersant may contain other components such as condensed phosphoric acid or its salt, phosphonic acid or phosphonate and poly(vinyl alcohol).

The content of the hydrophobic group-containing copolymer of this invention in the above inorganic pigment dispersant is in the range of 5-100 wt % on the total amount of the inorganic pigment dispersant. The composition may contain an optionally suitable water-soluble polymer within a range causing no effect on the performance and effect.

The above inorganic pigment dispersant exhibits its excellent performance in the case of applications as a dispersant of inorganic pigments such as heavy or light calcium carbonate and clay used for paper coating. For example, if a small amount of the inorganic pigment dispersant is added to an inorganic pigment and the mixture is dispersed in water, it is possible to prepare a high-concentration inorganic pigment slurry such as calcium carbonate slurry having a high concentration with low viscosity, high fluidity and good stability with time for these properties.

The amount of the above inorganic pigment dispersant used in the case of applications of the above inorganic pigment dispersant as a dispersant of inorganic pigments is in the range of 0.05-2.0 parts by weight per 100 parts by weight of inorganic pigment. As a result of the amount of the inorganic pigment dispersant being within the above range, it is possible to achieve a satisfactory dispersing effect corresponding to the amount added providing also an economical advantage.

<Laundry Detergent and Cleaning Compositions Use of the Copolymer>

The hydrophobic group-containing copolymer (or polymer composition) of this invention is usable in detergent compositions.

The content of the hydrophobic group-containing copolymer in detergent compositions is not especially restricted. However, from the viewpoint of allowing the copolymer to exhibit its excellent builder performance, the content of the hydrophobic group-containing copolymer is in the range of 0.1-20 wt %, preferably 0.3-15 wt % and optimally 0.5-10 wt % on the total amount of detergent composition.

The copolymers of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

The above-mentioned laundry detergent or cleaning composition preferably comprises from about 1% to about 20% by weight of the hydrophobic group-containing copolymer composition.

The surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. No. 6,153,577, U.S. Pat. No. 6,020,303 and U.S. Pat. No. 6,093,856; alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. No. 4,681,704, and U.S. Pat. No. 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1-30; $C_{10}$-$C_{18}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relates to compositions comprising the inventive copolymers and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Automatic detergent compositions may comprise low foaming nonionic surfactants (LFNIs). LFNI can be present in amounts from about 0.25% to about 4%. LFNIs are most typically used in automatic detergents on account of the improved water-sheeting action (especially from glass) which they confer to the gel automatic detergents. Preferred LFNIs include nonionic alkoxylated surfactants, especially ethoxylates derived from primary alcohols, and blends thereof with more sophisticated surfactants, such as the polyoxypropylene/polyoxyethylene/polyoxypropylene reverse block polymers. The PO/EO/PO polymer-type surfactants are well-known to have foam suppressing or defoaming action, especially in relation to common food soil ingredients such as egg. In a preferred embodiment, the LFNI is an ethoxylated surfactant derived from the reaction of a monohydroxy alcohol or alkylphenol containing from about 8 to about 20 carbon atoms, excluding cyclic carbon atoms, with from about 6 to about 15 moles of ethylene oxide per mole of alcohol or alkyl phenol on an average basis. A particularly preferred LFNI is derived from a straight chain fatty alcohol containing from about 16 to about 20 carbon atoms ($C_{16}$-$C_{20}$alcohol), preferably a $C_{18}$ alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Certain of the block polymer surfactant compounds designated PLURONIC® and TETRONIC® by the BASF-Wyandotte Corp., Wyandotte, Mich., are suitable in gel automatic detergents of the invention. LFNIs which may also be used include a C-18 alcohol polyethoxylate, having a degree of ethoxylation of about 8, commercially available as "SLF-18 Poly-tergent" from BASF Corp.

Dish washing compositions may additionally contain a dispersant polymer typically in the range from 0 to about 25%, preferably from about 0.5% to about 20%, more preferably from about 1% to about 7% by weight of the detergent. The dispersant polymer may be ethoxylated cationic diamines or ethoxylated cationic polyamines described in U.S. Pat. No. 4,659,802. Other dispersant polymers suitable for use include co-polymers synthesized from acrylic acid, maleic acid and methacrylic acid such as ACUSOL® 480N supplied by Rohm & Haas and an acrylic-maleic (ratio 80/20) phosphono end group dispersant copolymers sold under the tradename of Acusol 425N (E) available from Rohm & Haas. Polymers containing both carboxylate and sulphonate monomers, such as ALCOSPERSE® polymers (supplied by Alco) are also acceptable dispersant polymers. In one embodiment an ALCOSPERSE® polymer sold under the trade name ALCOSPERSE® 725, is a co-polymer of Styrene and Acrylic Acid with the following structure:

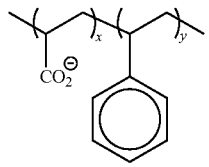

x:y=60:40, or 50:50, MW=8000.

ALCOSPERSE® 725 may also provide a metal corrosion inhibition benefit.

Other dispersant polymers are low molecular weight modified polyacrylate copolymers including the low molecular weight copolymers of unsaturated aliphatic carboxylic acids disclosed in U.S. Pat. Nos. 4,530,766, and 5,084,535 and European Patent Application No. 66,915, published Dec. 15, 1982.

Dish washing compositions may utilize detergent builders to assist in controlling mineral hardness and dispersancy. Inorganic as well as organic builders can be used. Embodiment of such dish washing product can be selected from the group consisting of phosphate, phosphate oligomers or polymers and salts thereof, silicate oligomers or polymers and salts thereof, aluminosilicates, magnesioaluminosiliates, citrate, methyl glycine diacetic acid and/or salts thereof, glutamatic diacetic acid and/or salts thereof and mixtures thereof. Phosphate detergent builders include, but are not limited to, the alkali metal, ammonium and alkanolammonium salts of polyphosphates. Silicate builders herein are any silicates which are soluble to the extent that they do not adversely affect spotting/filming characteristics of the gel detergent composition. Aluminosilicate builders can be used in the present compositions though are not preferred for automatic dishwashing detergents. Carbonate builders include alkaline earth and alkali metal carbonates as disclosed in German Patent Application No. 2,321,001 published on Nov. 15, 1973. Various grades and types of sodium carbonate and sodium sesquicarbonate can be used, certain of which are particularly useful as carriers for other ingredients, especially: detersive surfactants. Organic detergent builders include a wide variety of polycarboxylate compounds. Other useful builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various I alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof. Citrate builders, e.g., citric acid and soluble salts thereof (particularly sodium salt), are polycarboxylate builders of particular importance for heavy duty laundry detergent and automatic dishwashing formulations due to their availability from renewable resources and their biodegradability. Methyl glycine diacetic acid and/or salts thereof (MGDA) may also be utilized as builders in the present composition. A preferred MGDA compound is a salt of methyl glycine iacetic acid Suitable salts include the diammonium 1.0 slt, the dipotassium salt and, preferably, the disodium salt. Glutamatic diacetic acid and/or salts thereof (GLDA) may also be utilized as builders in the present compositions. A preferred GLDA compound is a salt of glutamic diacetic acid. Suitable salts include the diammonium salt, the dipotassium salt and, preferably, the disodium salt. 1-hydroxyethylidene-1,1-diphosphonic acid (HEDP) may also be utilized as a builder in the present compositions.

Perfume may be added to the compositions of the present invention. The detergent compositions can contain agents that are effective as corrosion inhibitors and/or anti-tarnish aids.

"Detergent enzyme", as used herein, means any enzyme having a cleaning, stain removing or otherwise beneficial effect in a gel detergent composition. Preferred enzymes are hydrolases such as proteases, amylases and lipases. Highly preferred for automatic dishwashing are amylases and/or proteases, including both current commercially available types and improved types. Enzyme-containing compositions herein can comprise from about 0.001% to about 10%, preferably from about 0.005% to about 8%, most preferably from about 0.01% to about 6%, by weight of an enzyme.

The compositions herein can also optionally contain one or more transition-metal selective sequestrants, "chelants" or "chelating agents", e.g., iron and/or copper and/or manganese chelating agents. Chelating agents suitable for use herein can be selected from the group consisting of aminocarboxylates, phosphonates (especially the aminophosphonates), polyfunctionally-substituted aromatic chelating agents, and mixtures thereof. Commercial chelating agents for use herein include the BEQUEST series, and chelants from Monsanto, DuPont, and Nalco, Inc.

The detergent composition can be preferably low foaming, readily soluble in the washing medium and most effective at pH values best conducive to improved cleaning performance, such as in a range of desirably from about pH 6.5 to about pH 12.5, and preferably from about pH 7.0 to about pH 12.0, more preferably from about pH 8.0 to about pH 12.0. The pH adjusting components are desirably selected from sodium or potassium hydroxide, sodium or potassium carbonate or sesquicarbonate, sodium or potassium silicate, boric acid, sodium or potassium bicarbonate, sodium or potassium borate, and mixtures thereof.

An embodiment of the present invention relates to a gel detergent composition comprising an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

Any adjunct ingredient in any amount may be used in the gel detergent composition. For example, adjunct ingredients may be selected from the group consisting of nanoparticles, functionalized surface molecules, polymers, surfactants, co-surfactants, metal ions, proteins, dyes, acids, optical brighteners, colorants, filler salts, hydrotropes, preservatives, anti-oxidants, germicides, fungicides, color speckles, solubilizing agents, carriers and mixtures thereof.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

The above-mentioned laundry detergent or cleaning composition preferably contains cleaning adjunct additives selected from the group consisting of enzymes, alkali builders, chelant builders, bleaches, bleaching assisting agents, perfumes, defoaming agents, bactericides, corrosion inhibitors, and mixtures thereof.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

If the above detergent compositions are liquid detergent compositions, the kaolin turbidity is generally below 200 mg/L, especially 150 mg/L, furthermore, 120 mg/L, preferably 100 mg/L and optimally 50 mg/L.

<Kaolin Turbidity Measurement Method>

A 10 mm thick and 50 mm square ell is filled with a sample (liquid detergent) stirred thoroughly to form a homogeneous state, and after degassing, the turbidity (kaolin turbidity: mg/L) is measured at 25° C. with a Nippon Denshoku turbidity meter, Model NDH2000 (trade name: rabidity meter).

The above detergent composition shows an excellent ability inhibiting precipitation, and it is possible to prepare a detergent composition showing extremely high quality performance and excellent stability being less liable to form impurity precipitates in the case of low temperature storage and providing no performance reduction after long-term storage.

The present invention further contains a cleaning implement comprising a nonwoven substrate and the above-mentioned laundry detergent or cleaning composition.

EXAMPLES

This invention is explained further in detail with application examples as follows, but this invention is not necessarily limited to these application examples alone. Incidentally, the "part" used is "part by weight" and "%" is "% by weight" unless specified.

Furthermore, the weight-average molecular weight, inhibitory ability, etc., of the hydrophobic group-containing copolymer of this invention were measure according the methods as follows.

<Weight-Average Molecular Weight Measurement Conditions>

Instrument: Hitachi L-7000 series
Detector: RI
Column: Showa Denko SHODEX Asahipak GF-310-HQ, GF-7, 10-HQ, GF-1G 7B
Column temperature: 40° C.
Flow rate: 0.5 mL/min
Working curve: Sowa Kagaku Polyacrylic acid standard
Elution solution: 0.1 N sodium acetate/acetonitrile=3/1 (ratio by weight)

<Method for Measurement of Precipitation Inhibitory Ability (Ability Inhibiting Precipitation of LAS-Ca Salt)>

(1) A glycine buffer solution was prepared by dissolving 9.3793 g of glycine, 9.6452 g of sodium chloride and 5.1975 g of sodium hydroxide in pure water and making up to 1,000.0 g.

(2) To 1.50 g of a 15% (w/w) aqueous solution of sodium dodecylbenzenesulfonate (LAS), 0.80 g of sodium sulfate and 11.25 g of the glycine buffer solution prepared in (1), pure water was added to make up to 500.0 g.

(3) A 0.1% (w/w) aqueous solution of sample polymer was prepared.

(4) A 1 M aqueous solution of calcium chloride dihydrate was prepared.

(5) A 100 mL beaker was charged with 1.80 g of the 0.1% sample polymer aqueous solution prepared in (3), 8.20 g of pure water and 80.00 g of the solution mixture of (2) to obtain a test solution.

(6) To the test solution, the 1 M aqueous solution of calcium chloride dihydrate prepared in (4) was added in drops, the mixture was stirred, and the rabidity of the mixture was measured. For the measurement, a Hiranuma Sanyo automated titrator (main unit: COM-550, optical measurement unit: M-500). The turbidity changes were determined with the changes in the transmittance at 650 nm wavelength.

(7) The transmittance at the point, where the amount of the 1 M aqueous solution of calcium chloride dihydrate added was 0.270 mL, was set as a precipitation inhibitory ability. Incidentally, the higher this value, the better the precipitation inhibitory ability.

<Polymer Composition Solid Content Measurement Method>

In an over at 130° C. under a nitrogen atmosphere, the polymer composition (1.0 g of polymer composition+3.0 g of water) was allowed to stand for 1 h to carry out a drying treatment. From the weight difference before and after drying, the solid content (%) and volatile component (%) were calculated.

Monomer Synthetic Example 1

A 500 mL glass separable flask quipped with a stirrer (paddle blades) was charged with 81.2 g of New Cole 2305 (5 mol ethylene oxide adduct of $C_{12-13}$ alcohol manufactured by Nippon Nyukazai K.K.) and 16.8 g of potassium hydroxide ("KOH" may be used below), nitrogen gas was blown in, the temperature was raised to 120° C. while stirring, and the same state was maintained for 1 h to carry out dehydration of the reaction system. A reflux condenser was attached, the temperature was reduced down to 60° C., 27.0 g of methallyl chloride (called MLC, below) was added taking 30 min, and subsequently, the reaction was carried out for 5 h. Subsequently, 200.0 g of pure water was added, the mixture was transferred to a separation funnel, allowed to stand for separation, and the bottom layer was removed. Subsequently, the top layer was transferred to a 300 mL pear flask, and the solvent was removed with a rotary evaporator. The salt precipitated was removed with filtration to obtain a monomer 1.

Application Example 1

A 1000 mL separable flask equipped with a reflux condenser, stirrer (paddle blades) was charged with 73.0 g of pure water, and 0.0127 g of Mohr's salt, and the temperature was raised to 90° C. while stirring to prepare a polymerization reaction system, While stirring the polymerization reaction system maintained at 90° C., 237.5 g of an 80% aqueous solution of acrylic acid (called 80% AA, below), 11.0 g of a 48% aqueous solution of sodium hydroxide (called 48% NaOH, below), 10.0 g of a monomer 1, 53.2 g of a 15% aqueous solution of sodium persulfate (called 15% NaPS, below) and 30.4 g of a 35% aqueous solution of sodium hydrogen sulfite (called 35% SBS, below) were added in drops from separate respective nozzles. The dropping times for the respective solutions were 180 min for the 80% AA and 48% NaOH, 120 min for the monomer 1, 190 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 186.9 g of the 48% NaOH was added gradually in drops to neutralize the polymerization reaction mixture solution.

As a result, it was possible to prepare an aqueous solution of the polymer 1 with a solid content of 44.8% and weight-average molecular weight of 8500 (polymer composition 1 of this invention).

Application Example 2

A 1000 mL separable flask equipped with a reflux condenser, stirrer (paddle blades) was charged with 89.0 g of pure water, 30.0 g of the monomer 1 and 0.0126 g of Mohr's salt, and the temperature was raised to 90° C. while stirring to prepare a polymerization reaction system, While stirring the polymerization reaction system maintained at 90° C., 212.5 g of the 80% AA, 9.8 g of the 48% NaOH, 48.5 g of the 15% NaPS and 34.7 of the 35% SBS were added in drops from separate respective nozzles. The dropping times for the respective solutions were 180 min for the 80% AA and 48% NaOH, 190 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 167.2 g of the 48% NaOH was added gradually in drops to neutralize the polymerization reaction mixture solution.

As a result, it was possible to prepare an aqueous solution of the polymer 2 with a solid content of 45.0% and weight-average molecular weight of 9700 (polymer composition 2 of this invention).

Monomer Synthetic Example 2

A 500 mL glass separable flask quipped with a stirrer (paddle blades) and reflux condenser was charged with 370.0 g of n-butyl alcohol and 4.27 g of KOH, the temperature was raised to 90° C. while stirring. Subsequently, 57.0 g of allyl glycidyl ether (also called AGE, below) was added by taking 30 min, and subsequently, the reaction was carried out for 5 h. After cooling to room temperature, the reaction mixture solution was neutralized with sulfuric acid, transferred to a 1000 mL pear-shaped flask, and the solvent removal was carried out with a rotary evaporator. Subsequently, 200.0 g of pure water was added, the mixture was transferred to a 500 mL separation funnel, allowed to stand for separation, and the bottom layer was removed. Subsequently, the top layer was transferred to a 300 mL pear flask, and the solvent was removed with a rotary evaporator. The salt precipitate was removed with filtration to obtain a monomer 2.

Application Example 3

A 1000 mL glass separable flask equipped with a reflux condenser, stirrer (paddle blades) was charged with 77.0 g of pure water and 0.0128 g of Mohr's salt, and the temperature was raised to 90° C. while stirring to prepare a polymerization reaction system, While stirring the polymerization reaction system maintained at 90° C., 225.0 g of the 80% AA, 10.4 g of the 48% NaOH, 20.0 g of the monomer 2, 52.1 g of the 15% NaPS and 44.7 of the 35% SBS were added in drops from separate respective nozzles. The dropping times for the respective solutions were 180 min for the 80% AA and 48% NaOH, 120 min for the monomer 2, 190 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 177.1 g of the 48% NaOH was added gradually in drops to neutralize the polymerization reaction mixture solution.

As a result, it was possible to prepare an aqueous solution of the polymer 3 with a solid content of 44.9% and weight-average molecular weight of 9200 (polymer composition 3 of this invention).

Monomer Synthetic Example 3

A 500 mL glass separable flask quipped with a stirrer (paddle blades) and reflux condenser was charged with 34.8 g 1 mol ethylene oxide adduct of methacrylic alcohol (also called MLA, below) and 1.8 g of KOH, the temperature was raised to 90° C. while stirring. Subsequently, 55.8 g of 2-ethylhexyl glycidyl ether (also called EHGE, below) was added by taking 30 min, and subsequently, the reaction was carried out for 5 h. Subsequently, 200.0 g of pure water was added, and after carrying out the reaction for 1 h, the reaction mixture was neutralized with sulfuric acid. After cooling to room temperature, the reaction mixture solution was transferred to a 500 mL separation funnel, allowed to stand for separation, and the bottom layer was removed. Subsequently, the top layer was transferred to a 300 mL pear flask, and the solvent was removed with a rotary evaporator. The salt precipitate was removed with filtration to obtain a monomer 3.

Application Example 4

A 1000 mL glass separable flask equipped with a reflux condenser, stirrer (paddle blades) was charged with 85.0 g of pure water and 0.0127 g of Mohr's salt, and the temperature was raised to 90° C. while stirring to prepare a polymerization reaction system, While stirring the polymerization reaction system maintained at 90° C., 212.5 g of the 80% AA, 9.8 g of the 48% NaOH, 30.0 g of the monomer 3, 49.2 g of the 15% NaPS and 49.2 of the 35% SBS were added in drops from separate respective nozzles. The dropping times for the respective solutions were 180 min for the 80% AA and 48% NaOH, 120 min for the monomer 3, 190 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 167.2 g of the 48% NaOH was added gradually in drops to neutralize the polymerization reaction mixture solution.

As a result, it was possible to prepare an aqueous solution of the polymer 4 with a solid content of 44.8% and weight-average molecular weight of 7600 (polymer composition 4 of this invention).

Monomer Synthetic Example 4

A 500 mL glass separable flask quipped with a stirrer (paddle blades) and reflux condenser was charged with 46.4 g of MLA1 and 2.0 g of KOH, the temperature was raised to 90° C. while stirring. Subsequently, 52.0 g of n-butyl glycidyl ether (also called BGE, below) was added by taking 30 min, and subsequently, the reaction was carried out for 5 h. Subsequently, 200.0 g of pure water was added, and after carrying out the reaction for 1 h, the reaction mixture was neutralized with sulfuric acid. After cooling to room temperature, the reaction mixture solution was transferred to a 500 mL separation funnel, allowed to stand for separation, and the bottom layer was removed. Subsequently, the top layer was transferred to a 300 mL pear flask, and the solvent was removed with a rotary evaporator. The salt precipitate was removed with filtration to obtain a monomer 4.

Application Example 5

A 1000 mL separable flask equipped with a reflux condenser, stirrer (paddle blades) was charged with 95.0 g of pure water, 40.0 g of the monomer 4 and 0.0124 g of Mohr's salt, and the temperature was raised to 90° C. while stirring to prepare a polymerization reaction system, While stirring the polymerization reaction system maintained at 90° C., 200.0 g of the 80% AA, 9.3 g of the 48% NaOH, 47.7 g of the 15% NaPS and 40.9 g of the 35% SBS were added in drops from separate respective nozzles. The dropping times for the respective solutions were 180 min for the 80% AA and 48% NaOH, 185 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 157.4 g of the 48% NaOH was added gradually in drops to neutralize the polymerization reaction mixture solution.

As a result, it was possible to prepare an aqueous solution of the polymer 5 with a solid content of 44.8% and weight-average molecular weight of 9000 (polymer composition 5 of this invention).

Monomer Synthetic Example 5

A 500 mL glass separable flask quipped with a stirrer (paddle blades) was charged with 63.6 g of New Cole 2303 (3 mol ethylene oxide adduct of $C_{12-13}$ alcohol manufactured by Nippon Nyukazai K.K.) and 16.8 g of KOH, nitrogen gas was blown in, the temperature was raised to 120° C. while stirring, and the same state was maintained for 1 h to carry out dehydration of the reaction system. A reflux condenser was attached, the temperature was reduced down to 60° C., 27.0 g of MLC was added taking 30 min, and subsequently, the reaction was carried out for 5 h. Subsequently, 200.0 g of pure water was added, and after carrying out the reaction for 1 h, the reaction mixture was neutralized with sulfuric acid. After cooling to room temperature, the reaction mixture solution was transferred to a 500 mL separation funnel, allowed to stand for separation, and the bottom layer was removed. Subsequently, the top layer was transferred to a 300 mL pear flask, and the solvent was removed with a rotary evaporator. The salt precipitate was removed with filtration to obtain a monomer 5.

Application Example 6

A 1000 mL glass separable flask equipped with a reflux condenser, stirrer (paddle blades) was charged with 70.0 g of pure water and 0.0130 g of Mohr's salt, and the temperature was raised to 90° C. while stirring to prepare a polymerization reaction system, While stirring the polymerization reaction system maintained at 90° C., 237.5 g of the 80% AA, 11.0 g of the 48% NaOH, 10.0 g of the monomer 5, 53.2 g of the 15% NaPS and 45.6 g of the 35% SBS were added in drops from separate respective nozzles. The dropping times for the respective solutions were 180 min for the 80% AA and 48% NaOH, 120 min for the monomer 5, 185 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 186.9 g of the 48% NaOH was added gradually in drops to neutralize the polymerization reaction mixture solution.

As a result, it was possible to prepare an aqueous solution of the polymer 6 with a solid content of 45.2% and weight-average molecular weight of 7500 (polymer composition 6 of this invention).

Monomer Synthetic Example 6

A 500 mL glass separable flask quipped with a stirrer (paddle blades) was charged with 61.2 g of New Cole 1004 (4 mol ethylene oxide adduct of $C_{12-13}$ alcohol manufactured by Nippon Nyukazai K.K.) and 16.8 g of KOH, nitrogen gas was blown in, the temperature was raised to 120° C. while stirring, and the same state was maintained for 1 h to carry out dehydration of the reaction system. A reflux condenser was attached, the temperature was reduced down to 60° C., 27.0 g of MLC was added taking 30 min, and subsequently, the reaction was carried out for 5 h. Subsequently, 200.0 g of pure water was added, and after carrying out the reaction for 1 h, the reaction mixture was neutralized with sulfuric acid. After cooling to room temperature, the reaction mixture solution was transferred to a 500 mL separation funnel, allowed to stand for separation, and the bottom layer was removed. Subsequently, the top layer was transferred to a 300 mL pear flask, and the solvent was removed with a rotary evaporator. The salt precipitate was removed with filtration to obtain a monomer 6.

Application Example 7

A 1000 mL glass separable flask equipped with a reflux condenser, stirrer (paddle blades) was charged with 110.0 g of pure water and 0.0122 g of Mohr's salt, and the temperature was raised to 90° C. while stirring to prepare a polymerization reaction system. While stirring the polymerization reaction system maintained at 90° C., 175.0 g of the 80% AA, 8.1 g of the 48% NaOH, 60.0 g of the monomer 6, 42.0 g of the 15% NaPS and 48.0 of the 35% SBS were added in drops from separate respective nozzles. The dropping times for the respective solutions were 180 min for the 80% AA and 48% NaOH, 120 min for the monomer 6, 185 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 137.7 g of the 48% NaOH was added gradually in drops to neutralize the polymerization reaction mixture solution.

As a result, it was possible to prepare an aqueous solution of the polymer 7 with a solid content of 45.0% and weight-average molecular weight of 8900 (polymer composition 7 of this invention).

Application Example 8

A 1000 mL glass separable flask equipped with a reflux condenser, stirrer (paddle blades) was charged with 82.0 g of pure water and 8.0 g of the monomer 1, and the temperature was raised to 90° C. while stirring to prepare a polymerization reaction system. While stirring the polymerization reaction system maintained at 90° C., 90.0 g of the 80% AA and 32.3 g of the 15% NaPS were added in drops from separate respective nozzles. The dropping times for the respective solutions were 90 min for the 80% AA and 110 min for the 15% NaPS. The speed of the addition of the respective solutions was set constant, and the addition was carried out continuously.

After completing the addition of the 80% AA, the reaction mixture solution was maintained (aged) at 90° C. for 60 min to complete the polymerization reaction. After completing the polymerization reaction, the reaction mixture solution was cooled while stirring, and 70.8 g of the 48% NaOH and 8.0 g of pure water were added gradually in drops to neutralize and dilute the polymerization reaction mixture solution.

As a result, it was possible to prepare an aqueous solution of the polymer 8 with a solid content of 36.0% and weight-average molecular weight of 112000 (polymer composition 8 of this invention).

Comparative Example 1

A 1000 mL glass separable flask equipped with a reflux condenser, stirrer (paddle blades) was charged with 119.0 g of pure water and 0.0120 g of Mohr's salt, and the temperature was raised to 90° C. while stirring to prepare a polymerization reaction system. While stirring the polymerization reaction system maintained at 90° C., 175.0 g of the 80% AA, 8.1 g of the 48% NaOH, 60.0 g of styrene (also called St, below), 33.6 g of the 15% NaPS and 36.0 g of the 35% SBS were added in drops from separate respective nozzles. The dropping times for the respective solutions were 180 min for the 80% AA and 48% NaOH, 120 min for St, 185 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 137.7 g of the 48% NaOH was added gradually in drops to neutralize the polymerization reaction mixture solution.

As a result, it was possible to prepare an aqueous solution of the comparative polymer 1 with a solid content of 45.0% and weight-average molecular weight of 8600 (comparative polymer composition 1 of this invention).

Comparative Example 2

A 1000 mL glass separable flask equipped with a reflux condenser, stirrer (paddle blades) was charged with 119.0 g of pure water and 0.0120 g of Mohr's salt, and the temperature was raised to 90° C. while stirring to prepare a polymerization reaction system. While stirring the polymerization reaction system maintained at 90° C., 175.0 g of the 80% AA, 8.1 g of the 48% NaOH, 60.0 g of butyl acrylate (also called BA, below), 32.7 g of the 15% NaPS and 35.0 g of the 35% SBS were added in drops from separate respective nozzles. The dropping times for the respective solutions were 180 min for the 80% AA and 48% NaOH, 120 min for BA, 185 min for the 15% NaPS and 175 min for the 35% SBS. The speed of the addition of the respective solutions was set constant, and the addition was carried out continuously.

After completing the addition of the 80% AA, the reaction mixture solution was maintained (aged) at 90° C. for 30 min to complete the polymerization reaction. After completing the polymerization reaction, the reaction mixture solution was cooled while stirring, and 137.7 g of the 48% NaOH was added gradually in drops to neutralize the polymerization reaction mixture solution.

As a result, it was possible to prepare an aqueous solution of the comparative polymer 2 with a solid content of 44.6% and weight-average molecular weight of 7200 (comparative polymer composition 2 of this invention).

Application Example 9

The precipitation inhibitory ability was evaluated for the polymer compositions of the application examples 1-7 and comparative examples 1-2 with the evaluation method described above. The results obtained are summarized in Table 1.

TABLE 1

|  | No. of carbon in the hydrophobic group | Ether bond-containing monomer-origin structural unit/carboxyl group-containing monomer-origin structural unit | Solid content (%) | Molecular weight (Mw/Mn) | Precipitation inhibitory ability |
|---|---|---|---|---|---|
| Application Example 1 | 12 | 5/95 | 44.8 | 8500/3000 | 81 |
| Application Example 2 | 12 | 15/85 | 45 | 9700/3600 | 79 |
| Application Example 3 | 4 | 10/90 | 44.9 | 9200/3400 | 75 |
| Application Example 4 | 8 | 15/85 | 44.8 | 7600/2800 | 78 |
| Application Example 5 | 4 | 20/80 | 44.8 | 9000/3500 | 78 |
| Application Example 6 | 12 | 5/95 | 45.2 | 7500/2500 | 82 |
| Application Example 7 | 8 | 30/70 | 45 | 8900/3200 | 82 |
| Comparative Example 1 | 6 | None (except St 10)/90 | 45 | 8600/3000 | 62 |
| Comparative Example 2 | 4 | None (except BA 10)/90 | 44.6 | 7200/3200 | 68 |

As apparent from the results shown in Table 1, the polymer composition of this invention was found to have a significantly excellent precipitation inhibitory ability compared with the comparative polymer compositions containing comparative polymers having no structural unit originated from ether bond-containing monomers as a hydrophobic monomer Composition Formulations Granular Laundry Detergent Examples 10

| Formula | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| 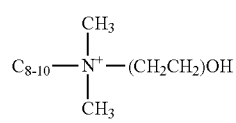 Sodium tripolyphosphate K1 | 20-40 | — | 18-33 | 12-22 | 0-15 |
| Zeolite | 0-10 | 20-40 | 0-3 | — | — |
| Silicate builder | 0-10 | 0-10 | 0-10 | 0-10 | 0-10 |
| Carbonate | 0-30 | 0-30 | 0-30 | 5-25 | 0-20 |
| Diethylene triamine penta acetate | 0-1 | 0-1 | 0-1 | 0-1 | 0-1 |
| Polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Copolymer[1] | 1-20 | 1-20 | 5.0 | 10 | 2.5 |
| Percarbonate | 0-10 | 0-10 | 0-10 | 0-10 | 0-10 |
| Nonanoyloxybenzenesulfonate | — | — | 0-2 | 0-2 | 0-2 |

-continued

| Formula | A wt % | B wt % | C wt % | D wt % | E wt % |
|---|---|---|---|---|---|
| Tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| MgSO$_4$ | — | — | 0-0.5 | 0-0.5 | 0-0.5 |
| Enzymes | 0-0.5 | 0-0.5 | 0-0.5 | 0-0.5 | 0-0.5 |
| Minors (perfume, dyes, suds stabilizers) | balance | balance | balance | balance | balance |

[1] A copolymer according to any of Application Examples 1, 2, 3, 4, 5, 6, 7 or 8.

Granular Laundry Detergent Example 11

Aqueous Slurry Composition

| Component | % w/w Aqueous slurry |
|---|---|
| A compound having the following general structure: bis(($C_2H_5O$)($C_2H_4O$)n)($CH_3$)—$N^{+30}$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.23 |
| Ethylenediamine disuccinic acid | 0.35 |
| Brightener | 0.12 |
| Magnesium sulphate | 0.72 |
| Acrylate/maleate copolymer | 6.45 |
| Copolymer [1] | 1.60 |
| Linear alkyl benzene sulphonate | 11.92 |
| Hydroxyethane di(methylene phosphonic acid) | 0.32 |
| Sodium carbonate | 4.32 |
| Sodium sulphate | 47.49 |
| Soap | 0.78 |
| Water | 24.29 |
| Miscellaneous | 0.42 |
| Total Parts | 100.00 |

[1] A copolymer or any mixture of copolymers according to any of Application Examples 1, 2, 3, 4, 5, 6, 7 or 8.

Preparation of a Spray-Dried Powder.

An aqueous slurry having the composition as described above is prepared having a moisture content of 25.89%. The aqueous slurry is heated to 72° C. and pumped under high pressure (from $5.5 \times 10^6 Nm^{-2}$ to $6.0 \times 10^6 Nm^{-2}$), into a counter current spray-drying tower with an air inlet temperature of from 270° C. to 300° C. The aqueous slurry is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 1.0 wt %, a bulk density of 427 g/l and a particle size distribution such that 95.2 wt % of the spray-dried powder has a particle size of from 150 to 710 micrometers. The composition of the spray-dried powder is given below.

Spray-Dried Powder Composition.

| Component | % w/w Spray-dried powder |
|---|---|
| A compound having the following general structure: bis(($C_2H_5O$)($C_2H_4O$)n)($CH_3$)-$N^+$—$C_xH_{2x}$—$N^+$—($CH_3$)—bis(($C_2H_5O$)($C_2H_4O$)n), wherein n = from 20 to 30, and x = from 3 to 8, or sulphated or sulphonated variants thereof | 1.62 |
| Ethylenediamine disuccinic acid | 0.46 |
| Brightener | 0.16 |
| Magnesium sulphate | 0.95 |
| Acrylate/maleate copolymer | 8.45 |
| Copolymer[1] | 2.09 |
| Linear alkyl benzene sulphonate | 15.65 |
| Hydroxyethane di(methylene phosphoric acid) | 0.42 |
| Sodium carbonate | 5.65 |
| Sodium sulphate | 61.98 |
| Soap | 1.02 |
| Water | 1.00 |
| Miscellaneous | 0.55 |
| Total Parts | 100.00 |

[1] A copolymer or any mixture of copolymers according to any of Application Examples 1, 2, 3, 4, 5, 6, 7 or 8.

Preparation of an Anionic Surfactant Particle 1

The anionic detersive surfactant particle 1 is made on a 520 g batch basis using a Tilt-A-Pin then Tilt-A-Plow mixer (both made by Processall). 108 g sodium sulphate supplied is added to the Tilt-A-Pin mixer along with 244 g sodium carbonate. 168 g of 70% active $C_{25}E_3S$ paste (sodium ethoxy sulphate based on $C_{12/15}$ alcohol and ethylene oxide) is added to the Tilt-A-Pin mixer. The components are then mixed at 1200 rpm for 10 seconds. The resulting powder is then transferred into a Tilt-A-Plow mixer and mixed at 200 rpm for 2 minutes to form particles. The particles are then dried in a fluid bed dryer at a rate of 25001/min at 120° C. until the equilibrium relative humidity of the particles is less than 15%. The dried particles are then sieved and the fraction through 1180 μm and on 250 μm is retained The composition of the anionic detersive surfactant particle 1 is as follows:
25.0% w/w $C_{25}E_3S$ sodium ethoxy sulphate
18.0% w/w sodium sulphate
57.0% w/w sodium carbonate Preparation of a Cationic Detersive Surfactant Particle 1

The cationic surfactant particle 1 is made on a 14.6 kg batch basis on a Morton FM-50 Loedige mixer. 4.5 kg of micronised sodium sulphate and 4.5 kg micronised sodium carbonate are premixed in the Morton FM-50 Loedige mixer. 4.6 kg of 40% active mono-$C_{12-14}$ alkyl mono-hydroxyethyl di-methyl quaternary ammonium chloride (cationic surfactant) aqueous solution is added to the Morton FM-50 Loedige mixer whilst both the main drive and the chopper are operating. After approximately two minutes of mixing, a 1.0 kg 1:1 weight ratio mix of micronised sodium sulphate and micronised sodium carbonate is added to the mixer. The resulting agglomerate is collected and dried using a fluid bed dryer on a basis of 2500 l/min air at 100-140° C. for 30 minutes. The resulting powder is sieved and the fraction through 1400 μm is collected as the cationic surfactant particle 1. The composition of the cationic surfactant particle 1 is as follows:

15% w/w mono-$C_{12-14}$ alkyl mono-hydroxyethyl di-methyl quaternary ammonium chloride
40.76% w/w sodium carbonate
40.76% w/w sodium sulphate
3.48% w/w moisture and miscellaneous Preparation of a Granular Laundry Detergent Composition 10.84 kg of the spray-dried powder of example 6, 4.76 kg of the anionic detersive surfactant particle 1, 1.57 kg of the cationic detersive surfactant particle 1 and 7.83 kg (total amount) of other individually dosed dry-added material are dosed into a 1 m diameter concrete batch mixer operating at 24 rpm. Once all of the materials are dosed into the mixer, the mixture is mixed for 5 minutes to form a granular laundry detergent composition. The formulation of the granular laundry detergent composition is described below:

A Granular Laundry Detergent Composition.

| Component | % w/w granular laundry detergent composition |
|---|---|
| Spray-dried powder from earlier table in Example 5 | 43.34 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 wt % active) | 0.87 |
| Acrylate/maleate copolymer particle (95.7 wt % active) | 0.29 |
| Green/Blue carbonate speckle | 0.50 |
| Anionic detersive surfactant particle 1 | 19.04 |
| Cationic detersive surfactant particle 1 | 6.27 |
| Sodium sulphate | 3.32 |
| Solid perfume particle | 0.63 |
| Total Parts | 100.00 |

Liquid Laundry Detergents Example 12

| Ingredient | A wt % | B wt % | C wt % | D wt % | E wt % |
|---|---|---|---|---|---|
| Sodium alkyl ether sulfate | 14.4% | | 9.2% | 5.4% | |
| Linear alkylbenzene sulfonic acid | 4.4% | 12.2% | 5.7% | 1.3% | |
| Alkyl ethoxylate | 2.2% | 8.8% | 8.1% | 3.4% | |
| Amine oxide | 0.7% | 1.5% | | | |
| Citric acid | 2.0% | 3.4% | 1.9% | 1.0% | 1.6% |
| Fatty acid | 3.0% | 8.3% | | | 16.0% |
| Protease | 1.0% | 0.7% | 1.0% | | 2.5% |
| Amylase | 0.2% | 0.2% | | | 0.3% |
| Borax | 1.5% | 2.4% | 2.9% | | |
| Calcium and sodium formate | 0.2% | | | | |
| Formic acid | | | | | 1.1% |
| Copolymer[1] | 1.8% | 2.1% | | | 3.2% |
| Sodium polyacrylate | | | | 0.2% | |
| Sodium polyacrylate copolymer | | | 0.6% | | |
| Fluorescent whitening agent | 0.15% | 0.2% | 0.12% | 0.12% | 0.2% |
| Ethanol | 2.5% | 1.4% | 1.5% | | |
| Propanediol | 6.6% | 4.9% | 4.0% | | 15.7% |
| Sorbitol | | | 4.0% | | |
| Ethanolamine | 1.5% | 0.8% | 0.1% | | 11.0% |
| Sodium hydroxide | 3.0% | 4.9% | 1.9% | 1.0% | |
| Sodium cumene sulfonate | | 2.0% | | | |
| Silicone suds suppressor | | 0.01% | | | |
| Perfume | 0.3% | 0.7% | 0.3% | 0.4% | 0.6% |
| Opacifier[5] | | 0.30% | 0.20% | | 0.50% |
| Water | balance 100.0% | balance 100.0% | balance 100.0% | balance 100.0% | balance 100.0% |

[1]A copolymer or any mixture of copolymers according to any of Application Examples 1, 2, 3, 4, 5, 6, 7 or 8.
[2]diethylenetriaminepentaacetic acid, sodium salt
[3]diethylenetriaminepentakismethylenephosphonic acid, sodium salt
[4]ethylenediaminetetraacetic acid, sodium salt
[5]Acusol OP 301

| Ingredient | F wt % | G wt % | H wt % | I wt % | J wt % | K wt % |
|---|---|---|---|---|---|---|
| Alkylbenzene sulfonic acid | 7 | 7 | 4.5 | 1.2 | 1.5 | 12.5 |
| Sodium C12-14 alkyl ethoxy 3 sulfate | 2.3 | 2.3 | 4.5 | 4.5 | 7 | 18 |
| C14-15 alkyl 8-ethoxylate | 5 | 5 | 2.5 | 2.6 | 4.5 | 4 |
| C12 alkyl dimethyl amine oxide | — | 2 | — | — | — | — |
| C12-14 alkyl hydroxyethyl dimethyl ammonium chloride | — | — | — | 0.5 | — | — |
| C12-18 Fatty acid | 2.6 | 3 | 4 | 2.6 | 2.8 | 11 |
| Citric acid | 2.6 | 2 | 1.5 | 2 | 2.5 | 3.5 |
| Protease enzyme | 0.5 | 0.5 | 0.6 | 0.3 | 0.5 | 2 |
| Amylase enzyme | 0.1 | 0.1 | 0.15 | — | 0.05 | 0.5 |
| Mannanase enzyme | 0.05 | — | 0.05 | — | — | 0.1 |

| Ingredient | F wt % | G wt % | H wt % | I wt % | J wt % | K wt % |
|---|---|---|---|---|---|---|
| Copolymer[1] | 1.0 | .8 | 1 | 0.4 | 1.5 | 2.7 |
| Hydroxyethane diphosphonic acid | — | — | 0.45 | — | — | 1.5 |
| FWA | 0.1 | 0.1 | 0.1 | — | — | 0.2 |
| Solvents (1,2 propanediol, ethanol), stabilizers | 3 | 4 | 1.5 | 1.5 | 2 | 4.3 |
| Hydrogenated castor oil derivative structurant | 0.4 | 0.3 | 0.3 | 0.1 | 0.3 | — |
| Boric acid | 1.5 | 2 | 2 | 1.5 | 1.5 | 0.5 |
| Na formate | — | — | — | 1 | — | — |
| Reversible protease inhibitor[3] | — | — | 0.002 | — | — | — |
| Perfume | 0.5 | 0.7 | 0.5 | 0.5 | 0.8 | 1.5 |
| Buffers (sodium hydroxide, Monoethanolamine) | To pH 8.2 | | | | | |
| Water and minors (antifoam, aesthetics, . . .) | To 100 | | | | | |

[1] The copolymer or any mixture of copolymers according to any of Application Examples 1, 2, 3, 4, 5, 6, 7 or 8.

| Ingredient | L wt % | M wt % | N wt % | O wt % | P wt % | Q wt % |
|---|---|---|---|---|---|---|
| Alkylbenzene sulfonic acid | 5.5 | 2.7 | 2.2 | 12.2 | 5.2 | 5.2 |
| Sodium C12-14 alkyl ethoxy 3 sulfate | 16.5 | 20 | 9.5 | 7.7 | 1.8 | 1.8 |
| Sodium C12-14 alkyl sulfate | 8.9 | 6.5 | 2.9 | — | | |
| C12-14 alkyl 7-ethoxylate | | | | | 0.15 | 0.15 |
| C14-15 alkyl 8-ethoxylate | | | | | 3.5 | 3.5 |
| C12-15 alkyl 9-ethoxylate | 1.7 | 0.8 | 0.3 | 18.1 | — | — |
| C12-18 Fatty acid | 2.2 | 2.0 | — | 1.3 | 2.6 | 2.6 |
| Citric acid | 3.5 | 3.8 | 2.2 | 2.4 | 2.5 | 2.5 |
| Protease enzyme | 1.7 | 1.4 | 0.4 | — | 0.5 | 0.5 |
| Amylase enzyme | 0.4 | 0.3 | — | — | 0.1 | 0.1 |
| Mannanase enzyme | | | | | 0.04 | 0.04 |
| Copolymer[1] | 2.1 | 1.2 | 1.0 | 2 | 1.00 | 0.25 |
| PEG-PVAc Polymer[2] | — | — | — | — | — | 0.3 |
| Ethoxysulfated Hexamethylene Diamine | — | — | — | — | — | 0.7 |
| Dimethyl Quat | — | — | — | — | — | — |
| FWA | — | — | — | — | .04 | .04 |
| Solvents (1,2 propanediol, ethanol, stabilizers | 7 | 7.2 | 3.6 | 3.7 | 1.9 | 1.9 |
| Hydrogenated castor oil derivative structurant | 0.3 | 0.2 | 0.2 | 0.2 | 0.35 | 0.35 |
| Polyacrylate | — | — | — | 0.1 | — | — |
| Polyacrylate copolymer[3] | — | — | — | 0.5 | — | — |
| Sodium carbonate | — | — | — | 0.3 | — | — |
| Sodium silicate | — | — | — | — | — | — |
| Borax | 3 | 3 | 2 | 1.3 | — | — |
| Boric acid | 1.5 | 2 | 2 | 1.5 | 1.5 | 1.5 |
| Perfume | 0.5 | 0.5 | 0.5 | 0.8 | 0.5 | 0.5 |
| Buffers (sodium hydroxide, monoethanolamine) | | | | | 3.3 | 3.3 |
| Water, dyes and miscellaneous | Balance | | | | | |

[1] Copolymer or any mixture of copolymers according to any of Application Examples 1, 2, 3, 4, 5, 6, 7 or 8.
[2] PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3] Alco 725 (styrene/acrylate)

Liquid Dish Handwashing Detergents Example 13

| Composition | A | B |
|---|---|---|
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Copolymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |
| Suds boosting polymer[4] | 0.2 | 0.2 |
| Water | Balance | Balance |

[1] A copolymer or any mixture of polymers according to any of Application Examples 1, 2, 3, 4, 5, 6, 7 or 8.
[2] Nonionic may be either $C_{11}$ Alkyl ethoxylated surfactant containing 9 ethoxy groups.
[3] 1,3,BAC is 1,3 bis(methylamine)-cyclohexane.
[4] (N,N-dimethylamino)ethyl methacrylate homopolymer Automatic Dishwasher Detergents Example 14

|  | A | B | C | D | E | F | G |
|---|---|---|---|---|---|---|---|
| Sodium tripolyphosphate | 0 | 6 | 10 | 0-20 | 0 | 0 | 0 |
| Silicate solids | 6 | 6 | 6 | 6-10 | 1.5-2.5 | 2.5-6 | 2.5-6 |
| Carbonate | 35 | 40 | 40 | 25-40 |  | 25-40 | 25-40 |
| Sodium Bicarbonate |  |  |  |  | 5-15 |  |  |
| Xanthan gum |  |  |  |  | 0.5-1.0 |  |  |
| MGDA |  |  |  |  | 4.0-7.5 | 4-7 | 2-4 |
| HEDP |  |  |  |  |  | 0.05-0.3 | 0.05-0.3 |
| Nonionic surfactant[1] | 0 | 0 | 0 | 0.5-5 | 0.5-5 | 0.5-1.0 | 0.5-1.0 |
| Polymer dispersant[2] | 0.5 | 5 | 6 | 5 |  | 0.1-2.0 | 0.1-2.0 |
| Polymer dispersant[3] |  |  |  |  | 0.5-3.0 |  |  |
| Copolymer[4] | 0.05-10 | 1 | 2.5 | 5 | 6-8 | 4-6 | 2-3 |
| Enzymes | 0.3-0.8 | 0.3-0.8 | 0.3-0.8 | 0.3-0.8 | 0.5-1.0 | 0.25-0.6 | 0.25-0.6 |
| Bleach and bleach activators | 4 | 4 | 4 | 4 | 0 | 2.0-4.0 | 2.0-4.0 |
| Disodium citrate dihydrate | 0 | 0 | 0 | 2-20 | 0 | 0 | 0 |
| Sodium Sulfate | 30-50 | 30-50 | 30-50 | 30-50 | 0 | 30-50 | 30-50 |
| Perfume | 0.01-0.1 | 0.01-0.1 | 0.01-0.1 | 0.01-0.1 | 0.01-0.1 | 0.01-0.1 | 0.01-0.1 |
| Water, dye and other adjuncts | Balance to 100% | Balance to 100% | Balance to 100% | Balance to 100% | Balance to 100% | Balance to 100% | Balance to 100% |

[1] Such as SLF-18 POLY TERGENT from the BASF Corporation.
[2] Copolymer such as ACUSOL ® 445N from Rohm & Haas or ALCOSPERSE ® 725 from Alco.
[3] Ethoxylated cationic diame such as those disclosed in U.S. Pat. No. 4,659,802.
[4] A copolymer or any mixture of copolymers according to any of Application Examples 1, 2, 3, 4, 5, 6, 7 or 8.

Automatic Dishwashing Unit-Dose Products Example 15

| Example | A |
|---|---|
| Particulate composition |  |
| STPP | 0 |
| Silicate | 2-8 |
| Carbonate | 25-50 |
| Copolymer[1] | 5-10 |
| Polymer Dispersant[2] | 1-5 |
| Nonionic Surfactant[3] | 1-5 |
| Enzyme | 1-6 |
| Bleach and Bleach Activators | 2.5-10 |
| Perfume | 0.05-1 |
| Sodium Sulfate | 0-10 |
| Liquid composition |  |
| DPG | 40-50 |
| Nonionic Surfactant[3] | 40-50 |
| Neodol C11E9 | 0-5.0 |
| Glycerine | 0-5.0 |
| Dye | 0.1-1.0 |

[1] A copolymer or any mixture of copolymers according to any of Application Examples 1, 2, 3, 4, 5, 6, 7 or 8.
[2] Copolymer such as ACUSOL ® 445N from Rohm & Haas or ALCOSPERSE ® 725 from Alco.
[3] Such as SLF-18 POLY TERGENT from the BASF Corporation.

The invention claimed is:

1. A laundry detergent or cleaning composition which comprises a hydrophobic group-containing copolymer characterized by having 1 wt % or more but below 50 wt % of a structural unit (a) derived from at least one kind of monomer (A) selected from ether bond-containing monomers represented by the following formulas (1) and (2);

[Chemical formula 1]

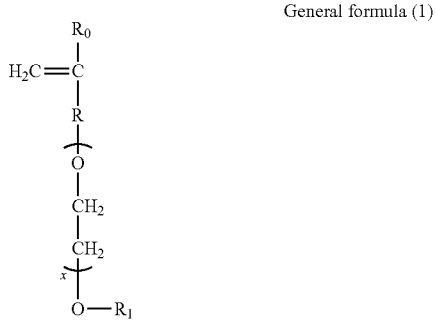

General formula (1)

in the above formula (1), $R_0$ is a hydrogen atom or $CH_3$ group, R is a $CH_2$ group, $CH_2CH_2$ group or single bond, X is a number in the range of 0-5 (provided X is a number in the range of 1-5 if R is a single bond), and $R_1$ is an organic group having 6-16 carbon atoms;

[Chemical formula 2]

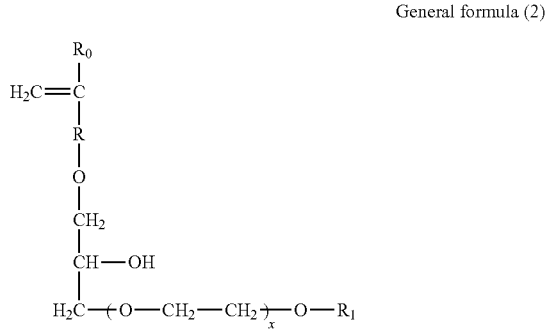

General formula (2)

in the above general formula (2), $R_0$ is a hydrogen atom or $CH_3$ group, R is a $CH_2$ group, $CH_2CH_2$ group or single bond, X is a number in the range of 0-5, and $R_1$ is a hydrogen atom or organic group having 1-20 carbon atoms; and 50 wt % or more but 99 wt % or less of a structural unit (b) derived from a carboxyl group-containing monomer (B) as an essential constituting unit, wherein the carboxyl group-containing monomer (B) is acrylic acid or an acrylate salt.

2. A laundry detergent or cleaning composition according to claim 1 wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing compositions, and tab/unit dose form automatic dishwashing compositions.

3. A laundry detergent or cleaning composition according to claim 1 wherein the detergent or cleaning composition comprises from about 1% to about 20% by weight of the hydrophobic group-containing copolymer composition.

4. A laundry detergent or cleaning composition according to claim 1 wherein the detergent or composition further comprises a surfactant system.

5. A laundry detergent or cleaning composition according to claim 4 wherein the surfactant system comprises $C_{10}$-$C_{15}$ alkyl benzene sulfonates.

6. A laundry detergent or cleaning composition according to claim 4 wherein the surfactant system comprises $C_8$-$C_{18}$ linear alkyl sulfonate surfactant.

7. A laundry detergent or cleaning composition according claim 4 wherein the surfactant system further comprises one or more co-surfactants selected from the groups consisting of nonionic surfactants, cationic surfactants, anionic surfactants and mixtures thereof.

8. A laundry detergent or cleaning composition according to claim 1 wherein the detergent or composition further comprises cleaning adjunct additives selected from the group consisting of enzymes, alkali builders, chelant builders, bleaches, bleaching assisting agents, perfumes, defoaming agents, bactericides, corrosion inhibitors, and mixtures thereof.

9. A cleaning implement comprising a nonwoven substrate and the laundry detergent or cleaning composition according to claim 1.

* * * * *